US006540295B1

(12) United States Patent
Saberan et al.

(10) Patent No.: US 6,540,295 B1
(45) Date of Patent: Apr. 1, 2003

(54) VEHICLE SEAT

(75) Inventors: Mohammad Saberan, New Baltimore, MI (US); Ernesto Blanco, Belmont, MA (US); Eugene S. Dudash, Wixom, MI (US); H. Winston Maue, Farmington Hills, MI (US); Eric A. Partington, Troy, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 09/760,206

(22) Filed: Jan. 12, 2001

Related U.S. Application Data
(60) Provisional application No. 60/175,876, filed on Jan. 13, 2000.

(51) Int. Cl.$^7$ ................................................. A47C 1/02
(52) U.S. Cl. ............................ 297/344.21; 297/378.1; 297/354.13; 297/362.11; 297/283.3
(58) Field of Search ...................... 297/354.13, 354.12, 297/378.1, 378.12, 362, 362.11, 354.14, 94, 283.3

(56) References Cited

U.S. PATENT DOCUMENTS

| 2,796,919 | A | * | 6/1957 | Ginsberg ................. 297/283.3 |
| 4,314,385 | A | * | 2/1982 | Wimsatt et al. ............... 15/321 |
| 5,370,443 | A | * | 12/1994 | Maruyama ............... 297/284.1 |
| 5,841,249 | A | | 11/1998 | Zimmer et al. |
| 5,871,255 | A | * | 2/1999 | Harland et al. .......... 296/65.05 |
| 6,053,569 | A | * | 4/2000 | Flyborg ....................... 297/238 |
| 6,371,556 | B1 | * | 4/2000 | Arai ......................... 297/283.2 |
| 6,123,380 | A | * | 9/2000 | Sturt et al. ................ 296/65.09 |
| 6,135,558 | A | * | 10/2000 | Behrens et al. .......... 296/65.09 |
| 6,199,945 | B1 | * | 3/2001 | Kim ............................ 296/64 |

* cited by examiner

Primary Examiner—Peter M. Cuomo
Assistant Examiner—Erika Garrett
(74) Attorney, Agent, or Firm—MacMillan, Sobanski & Todd, LLC

(57) ABSTRACT

A vehicle seat is movable between a seating position and a storage position to form a relatively flat horizontal load floor. The seat includes a seat bottom and a seat back. A side member extends upward from the seat bottom. The seat back is rotatably mounted on the side member such that the seat back is rotatable about a horizontally extending axis. The seat back is preferably mounted on the side member so that the seat back can be rotated or flipped around by about 180 degrees so that a seating surface and a back surface of the seat back are rotatable to a reverse position. Preferably, the side member is pivotally attached to the seat bottom and is capable of moving the seat back into a generally horizontal position to define the load floor. An optional panel can be movably attached to the seat back. The panel is movable between a first position adjacent the seat back, and an extended position extending outward from the seat back and covering the seat bottom to further extend and define the load floor.

33 Claims, 20 Drawing Sheets

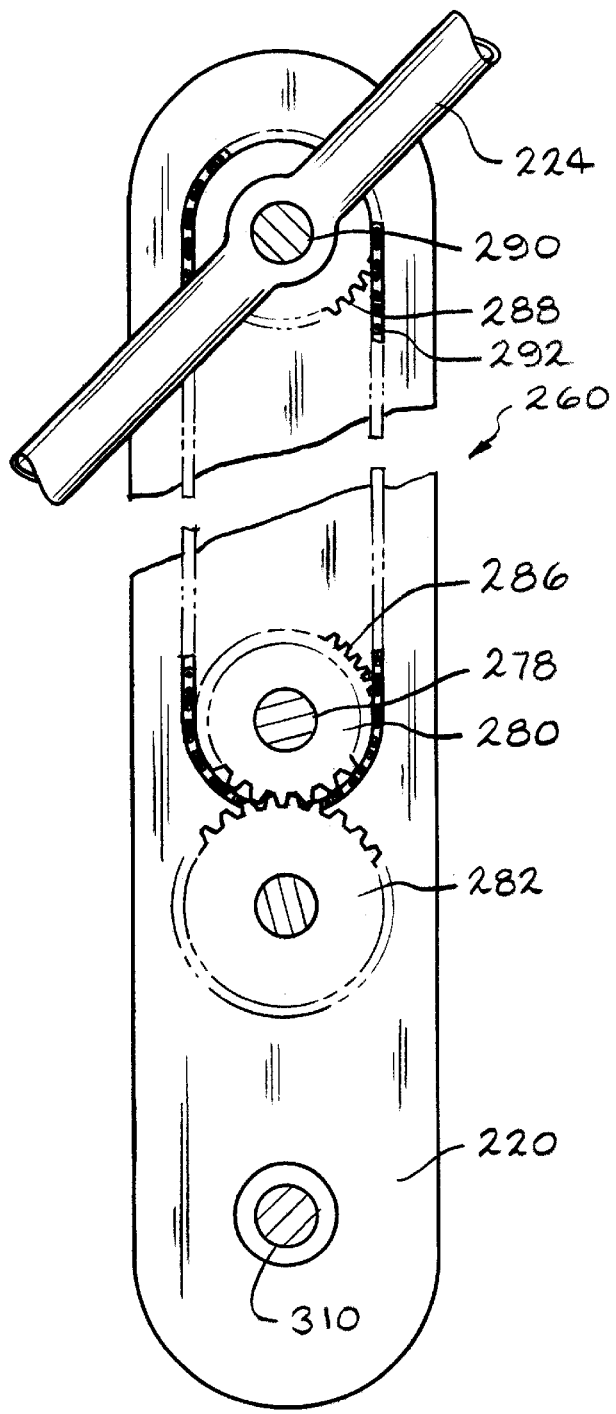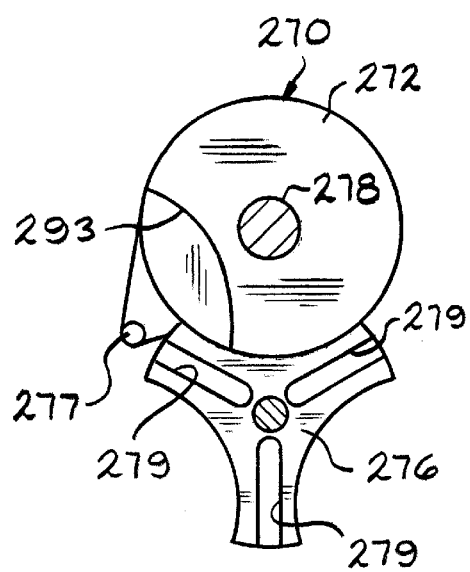
FIG. 17
FIG. 18

VEHICLE SEAT

CROSS REFERENCE TO RELATED APPLICATIONS

This application claims the benefit of U.S. Provisional Application No. 60/175,876 filed Jan. 13, 2000.

BACKGROUND OF THE INVENTION

This invention relates in general to vehicle seats, and in particular to a seat movable between a seating position and a storage position to form a generally horizontal flat load floor.

Some passenger vehicles, such as vans and sport utility-type vehicles, include multiple rows of seating within the interior of the vehicle. Often, these vehicles include a first or front row of seats for a driver and passenger, and one or more rows of rear seats behind the front row. Typically, the rear seats are bench-style seats having a common frame and seating positions for two or more occupants. The seats generally include a horizontal seat bottom and seat back extending vertically upward from the seat bottom.

It is generally desirable to temporarily remove the rear seats or position the rear seats into a storage position to create more cargo room in the interior of the vehicle. For example, some rear seats have seat backs which are pivotally mounted relative to the seat bottom. The seat backs can be pivoted forwardly to a storage position so that the seat back is in a generally horizontal position above the seat bottom. When the seat back is in its storage position, cargo can be placed on top of the seat back. The seat backs can also be configured to recline or pivot rearwardly so that the seat back lies in a generally horizontal position behind and adjacent the seat bottom. Although this position can provide a generally horizontal surface, any cargo placed thereon may damage the trim material of the seat back and bottom. Also, the horizontal surface defined by the seat back and seat bottom is typically not flat due to the contours of the seating surface of the seat back and seat bottom.

SUMMARY OF THE INVENTION

This invention relates to a vehicle seat which is capable of being moved between a seating position and a storage position which defines a generally flat load floor.

The vehicle seat is preferably movable between a seating position and a storage position to form a relatively flat horizontal load floor. The seat includes a seat bottom and a seat back. A side member extends upward from the seat bottom. The seat back is rotatably mounted on the side member such that the seat back is rotatable about a horizontally extending axis. The seat back is preferably mounted on the side member so that the seat back can be rotated or flipped around by about 180 degrees so that a seating surface and a back surface of the seat back are rotatable to a reverse position. Preferably, the side member is pivotally attached to the seat bottom and is capable of moving the seat back into a generally horizontal position to define the load floor. An optional panel can be movably attached to the seat back. The panel is movable between a first position adjacent the seat back, and an extended position extending outward from the seat back and covering the seat bottom to further extend and define the load floor.

Various objects and advantages of this invention will become apparent to those skilled in the art from the following detailed description of the preferred embodiment, when read in light of the accompanying drawings.

BRIEF DESCRIPTION OF THE DRAWINGS

FIG. 17 is a sectional view taken along Lines 17—17 of FIG. 16.

FIG. 18 is a sectional view taken along Lines 18—18 of FIG. 16.

DETAILED DESCRIPTION OF THE INVENTION

Figure 1:
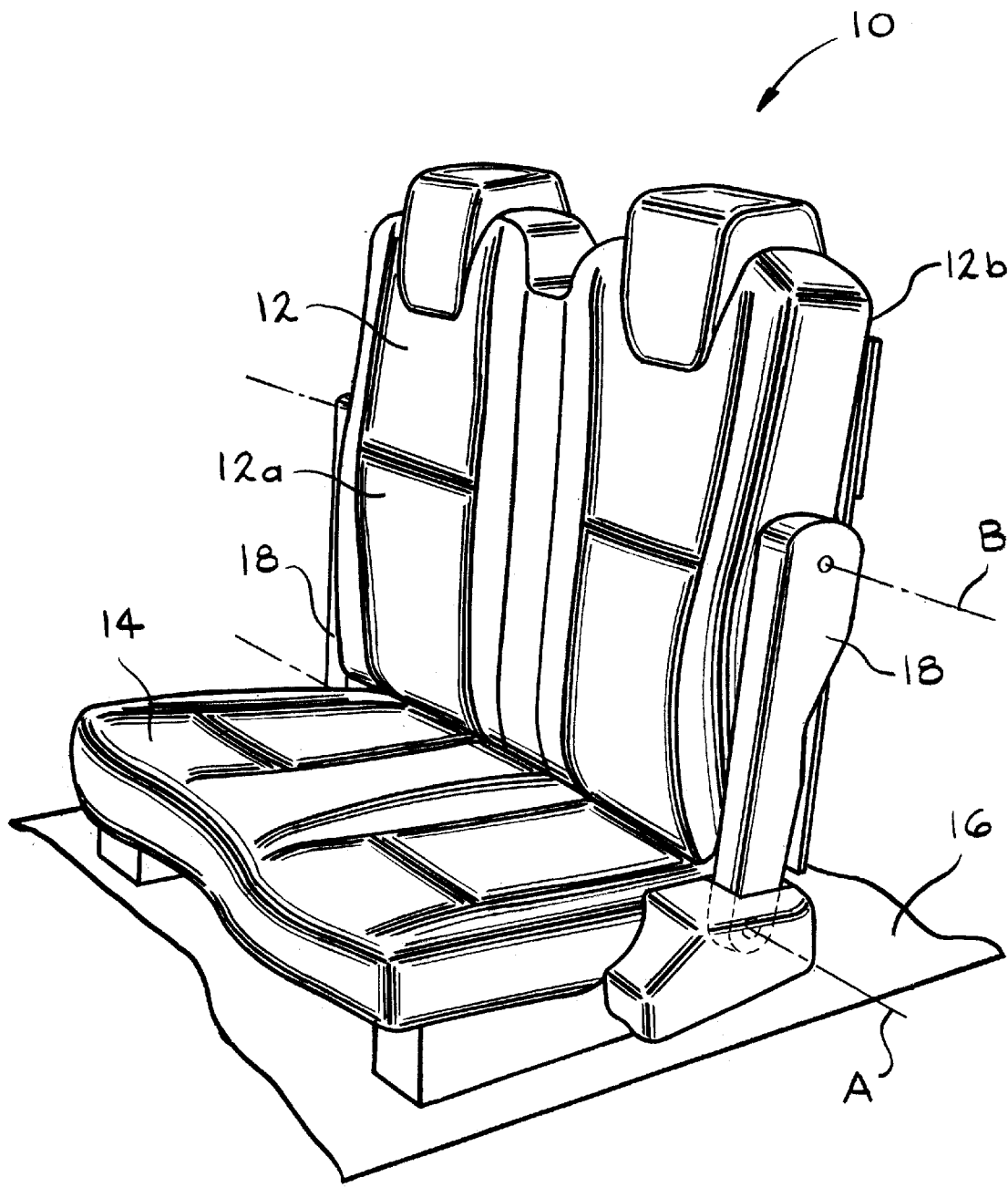
FIG. 1 is a perspective view of a first embodiment of a vehicle seat, in accordance with the present invention, illustrated in its upright position.

Referring now to the drawings, there is schematically illustrated in FIG. 1 a first embodiment of seat, indicated generally at 10, in accordance with the present invention. The seat 10 is preferably a vehicle seat which can be situated at any suitable position within the interior of the vehicle. For example, the seat 10 can be a two/three passenger second or third row seat in a van, sport utility vehicle, or stationwagon. As will be discussed in detail below, the seat back of the seat 10 is movable between an upright or seating position, as shown in FIG. 1, and a lowered or storage position, as : shown in FIGS. 7 and 8, such that the seat 10 and panels mounted thereon define a relatively flat load floor. The seat 10 and/or the panels can be moved entirely or partially by manual operation and/or by motorized mechanisms.

The seat 10 generally includes a seat back 12 and a seat bottom 14. The seat bottom 14 is mounted on a vehicle floor 16. If desired, the seat bottom 14 can be mounted on the floor 16 for fore and aft adjustment to position the seat 10 at a comfortable setting for the occupants. The seat back 12 defines a front portion 12a to provide a seating surface, and a rear portion 12b which normally faces the rear of the vehicle when the seat 10 is in its normal seating position, as shown in FIG. 1. The seat 10 includes a pair of side members or side arms 18 extended upward from the seat bottom 14. As will be explained in detail below, the lower portions of the side arms 18 are preferably pivotally mounted relative to the seat bottom 14 at an axis A to provide reclining movement of the seat back 12 relative to the seat bottom 14. The seat back 12 is pivotally mounted on upper portions the side arms 18 at a horizontally extending axis B, which provides rotational movement of the seat back 12 relative to the side arms 18, the reason for which will be explained in detail below.

Figure 2:
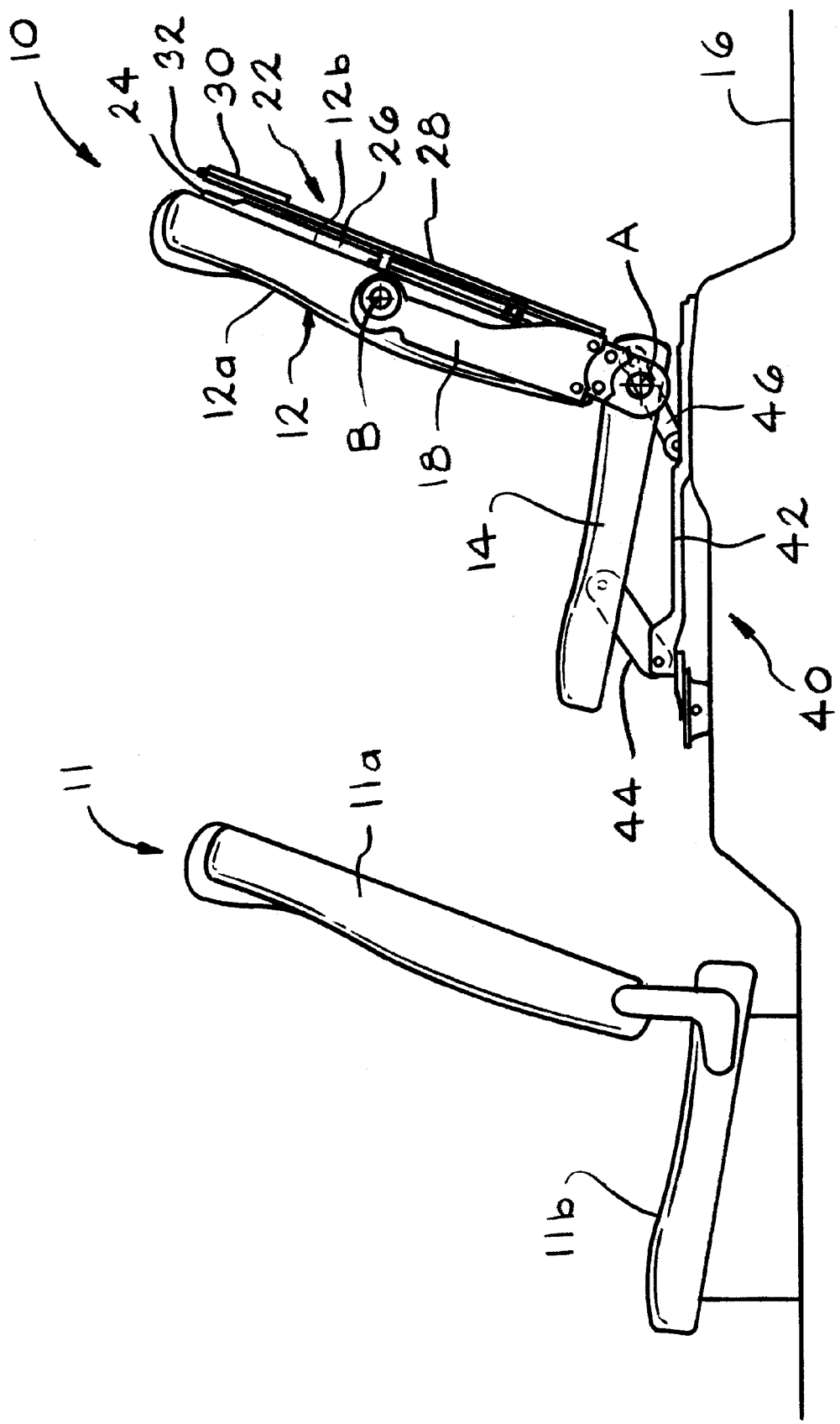
FIGS. 2 through 8 are schematic side elevational views of the seat of FIG. 1 along with another vehicle seat positioned in front of the seat of FIG. 1 illustrating sequential movement of the seats from their upright positions to their lowered positions form a generally horizontal flat load floor.
Figure 5:
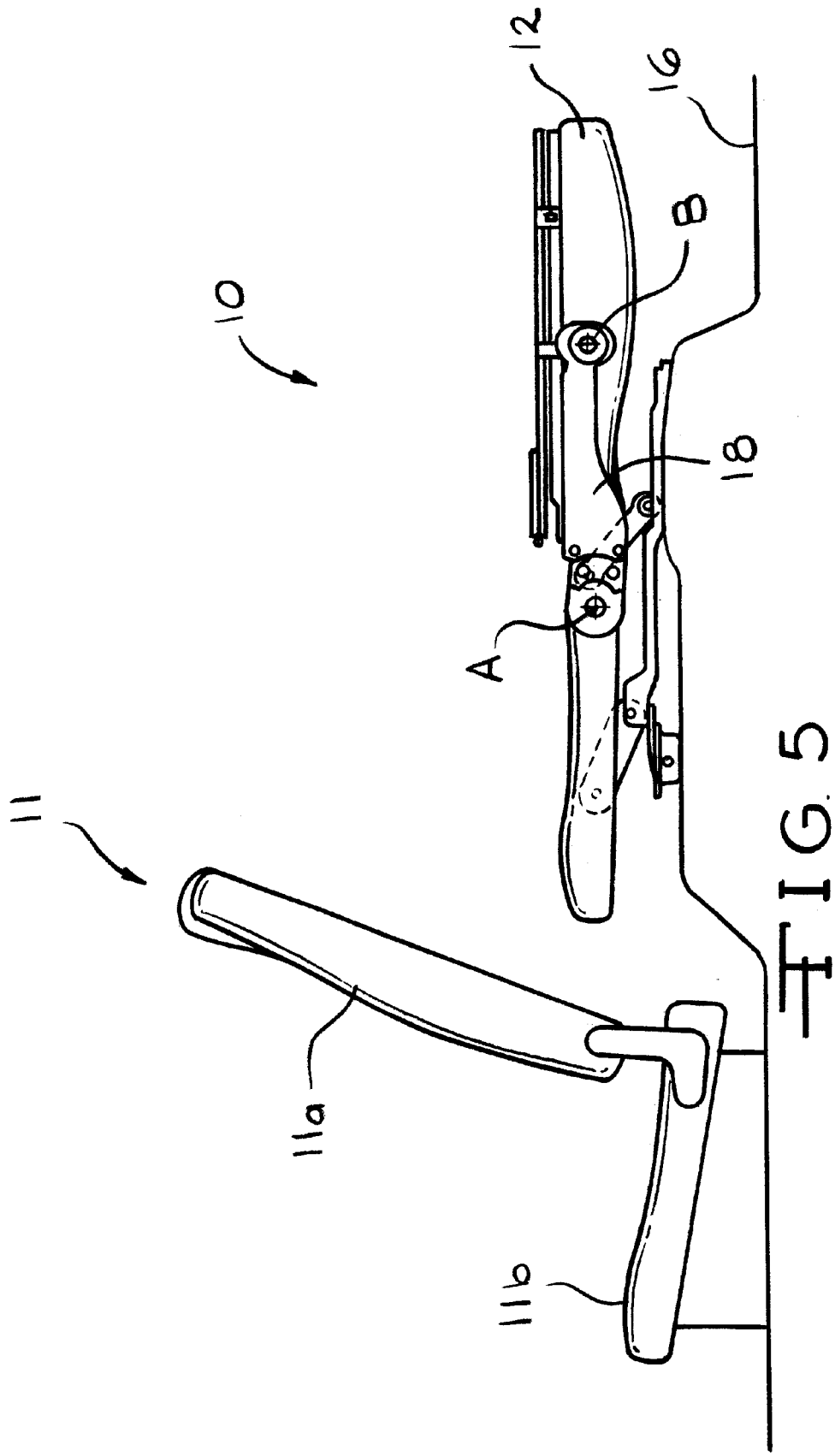
Figure 6:
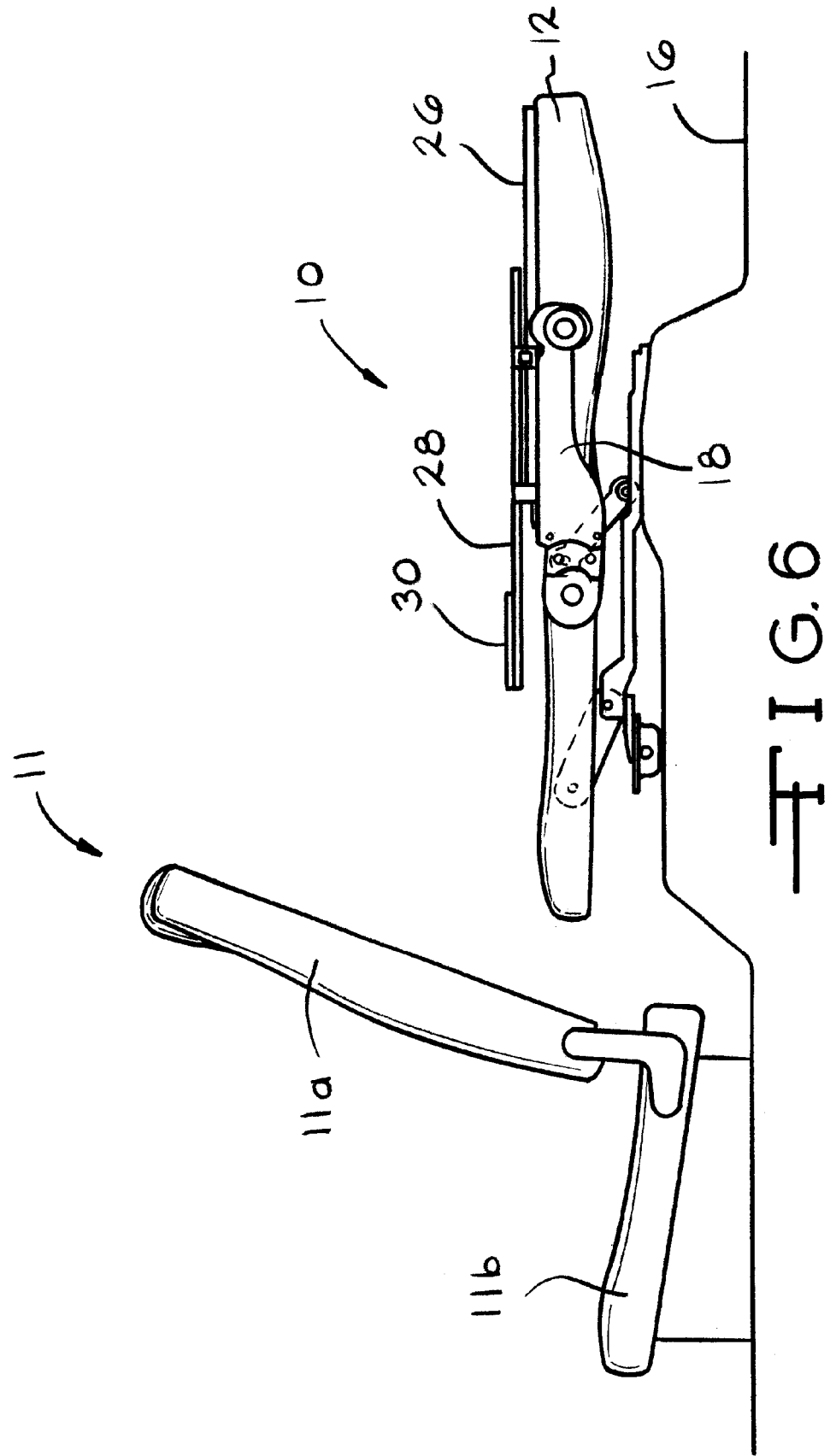
Figure 7:
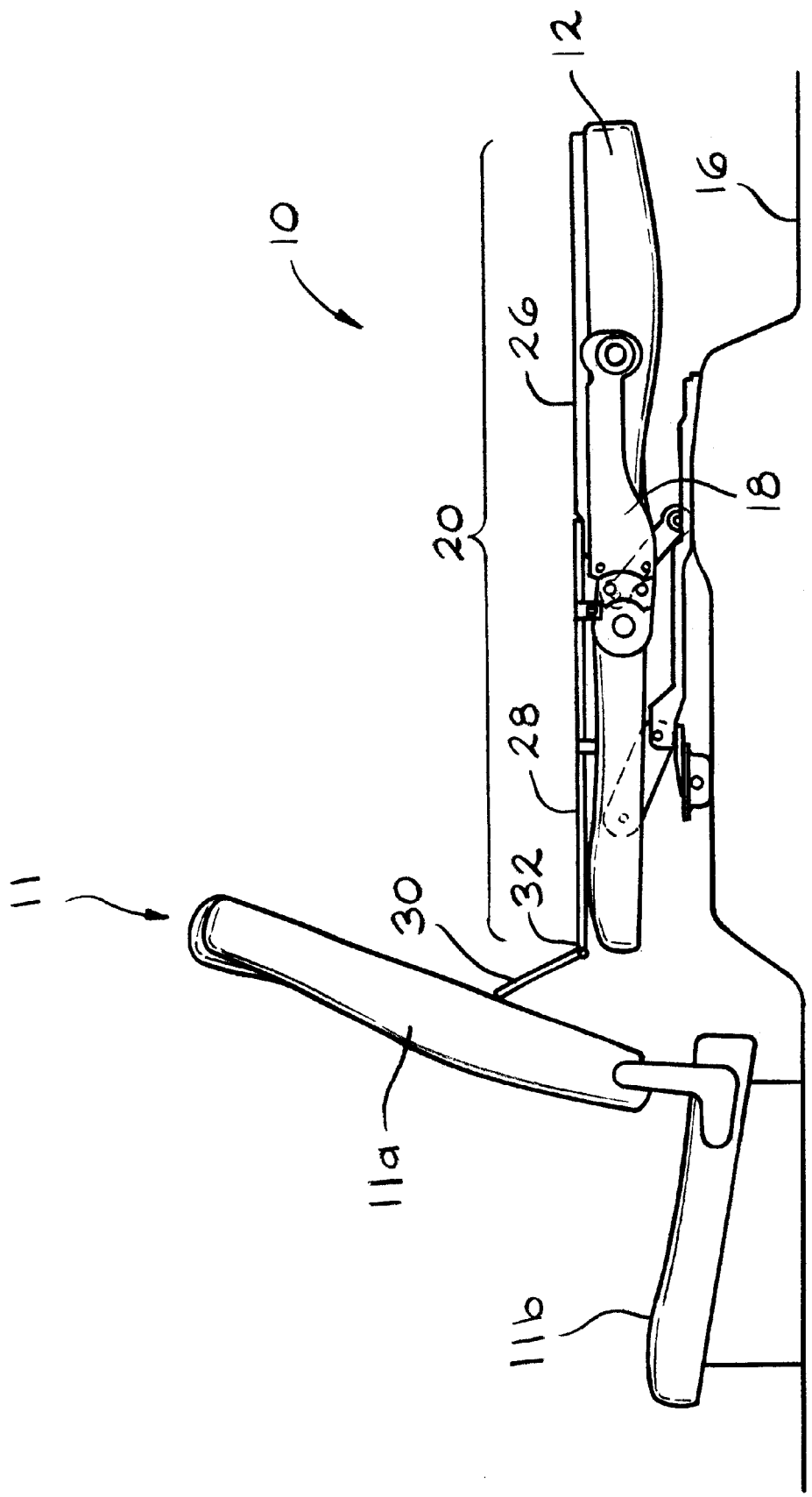
Figure 8:
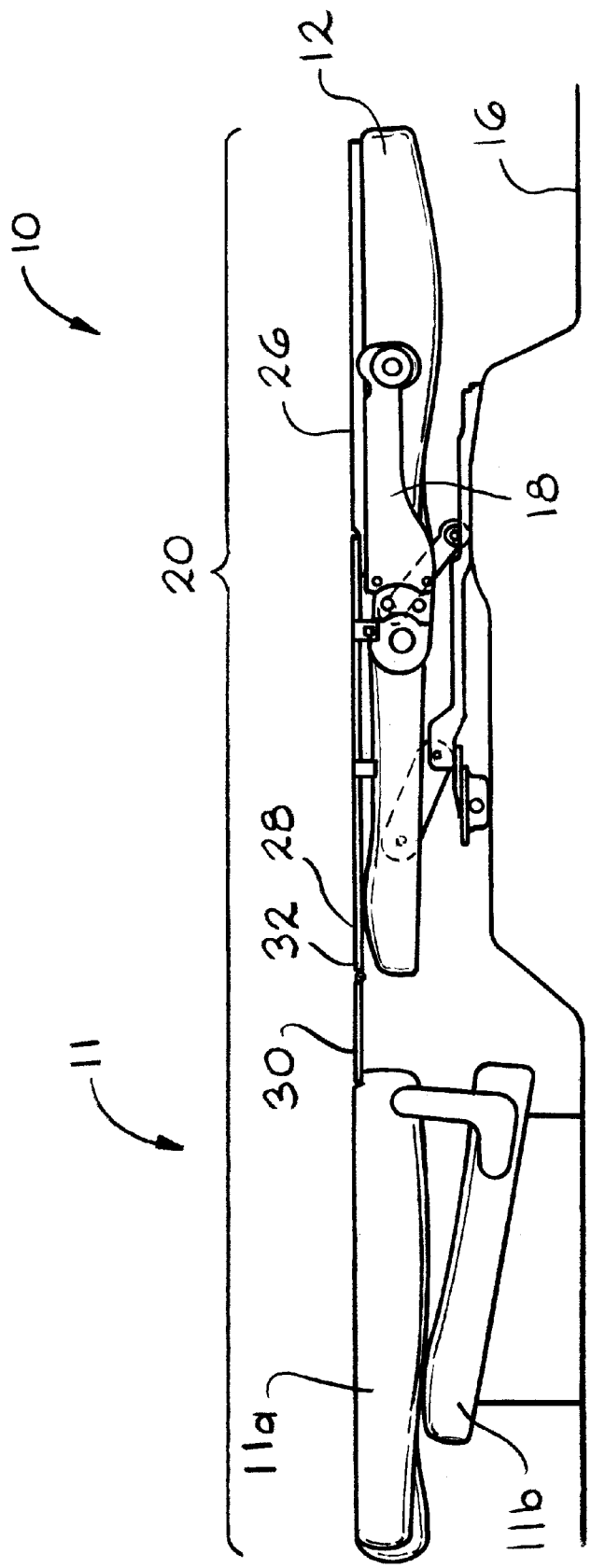

There is illustrated in FIGS. 2 through 8 schematic representations of an interior of a vehicle having the seat 10 and another seat 11 mounted on the vehicle floor 16. The seat 11 includes a seat back 11*a* and a seat bottom 11*b*. Preferably the seat back 11*a* is pivotally connected relative to the seat bottom 11*b* so that the seat back 11*a* is movable between an upright position, as shown in FIG. 1, and a lowered position, as shown in FIG. 8. The seat 10 is movable between an upright position, as shown in FIG. 2, to a lowered position, as shown in FIGS. 7 and 8, to form a generally horizontal load floor, indicated generally at 20.

Attached to the rear portion 12*b* of the seat back 12 is a panel assembly, indicated generally at 22. The panel assembly 22 includes a mounting assembly 24 attached to the rear portion of the seat back 12. The mounting assembly 24 includes a fixed backing panel. 26 mounted on the rear portion of the seat back 12. The panel assembly 22 also includes an extension panel 28 which is movable relative to the mounting assembly 24. A flip panel 30 is pivotally attached to a free end 32 of the extension panel 28. As will be described in detail below, the backing panel 26, the extension panel 28, and the flip panel 30 function as portions of the load floor 20.

Referring to FIG. 2, the seat 10 further includes an optional longitudinal movement mechanism, indicated generally at 40. The configuration of the mechanism 40 is generally a four bar linkage mechanism which provides movement of the seat 10 in a longitudinal direction relative of the vehicle floor 16, left and right as viewing FIG. 2, when advanced into the lowered position of the seat. As will be explained in detail below, the mechanism 40 generally moves the seat bottom 14 of the seat 10 into a more forward and lowered position, as shown in FIGS. 3–8, to provide clearance for the seat back 12 when positioned in its lowered position to provide the load floor 20. The mechanism 40 includes mounting bracket 42 fastened to the vehicle floor 16. The mechanism 40 further includes first and second links 44 and 46 pivotally connected on one end to the mounting bracket 42. The other ends of the first and second links 44 and 46 are pivotally connected to a portion of the seat bottom 14. The other ends of the firs and second links 44 and 46 are pivotally connected to a portion of the seat bottom 14.

Figure 3:
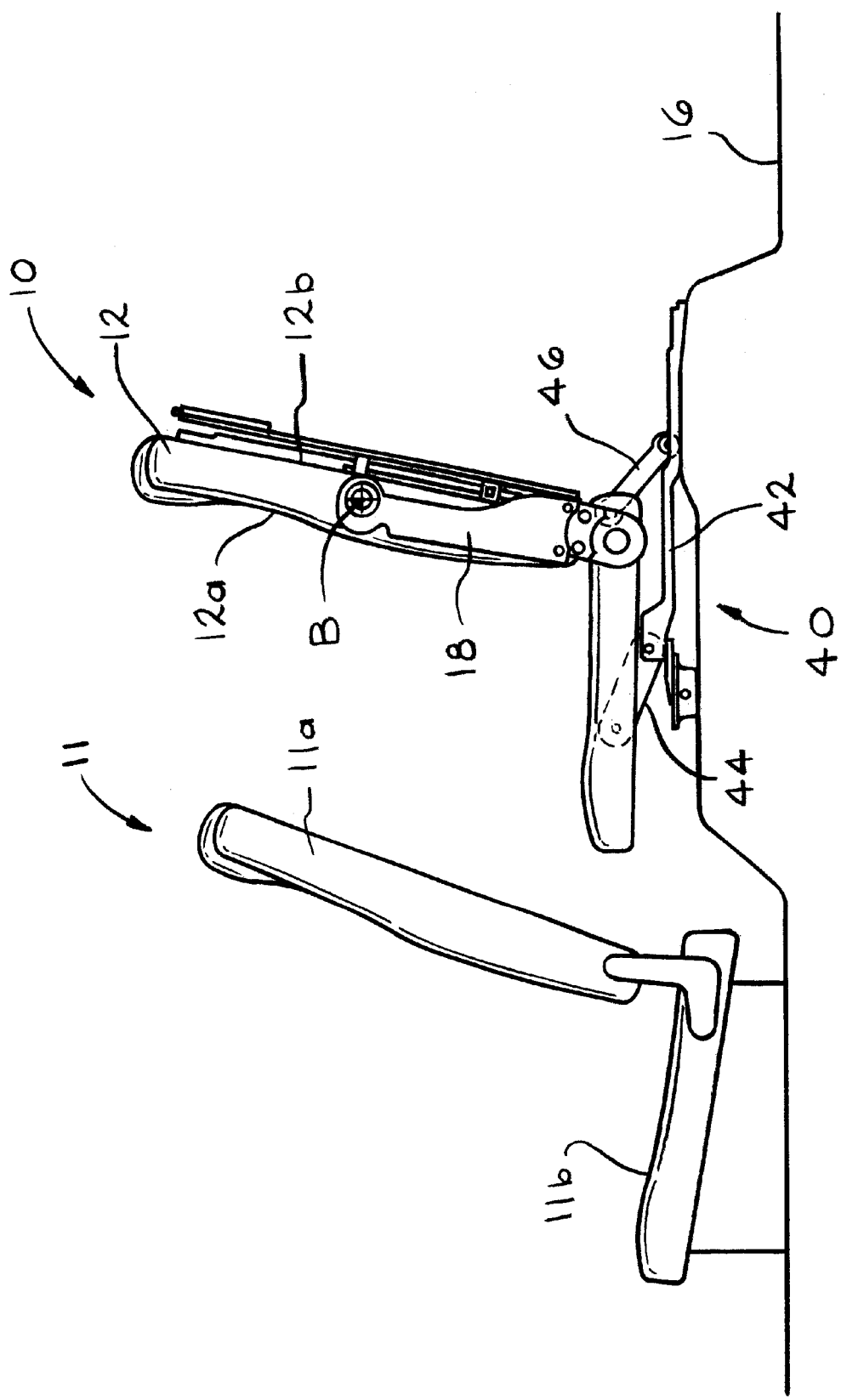
Figure 4:
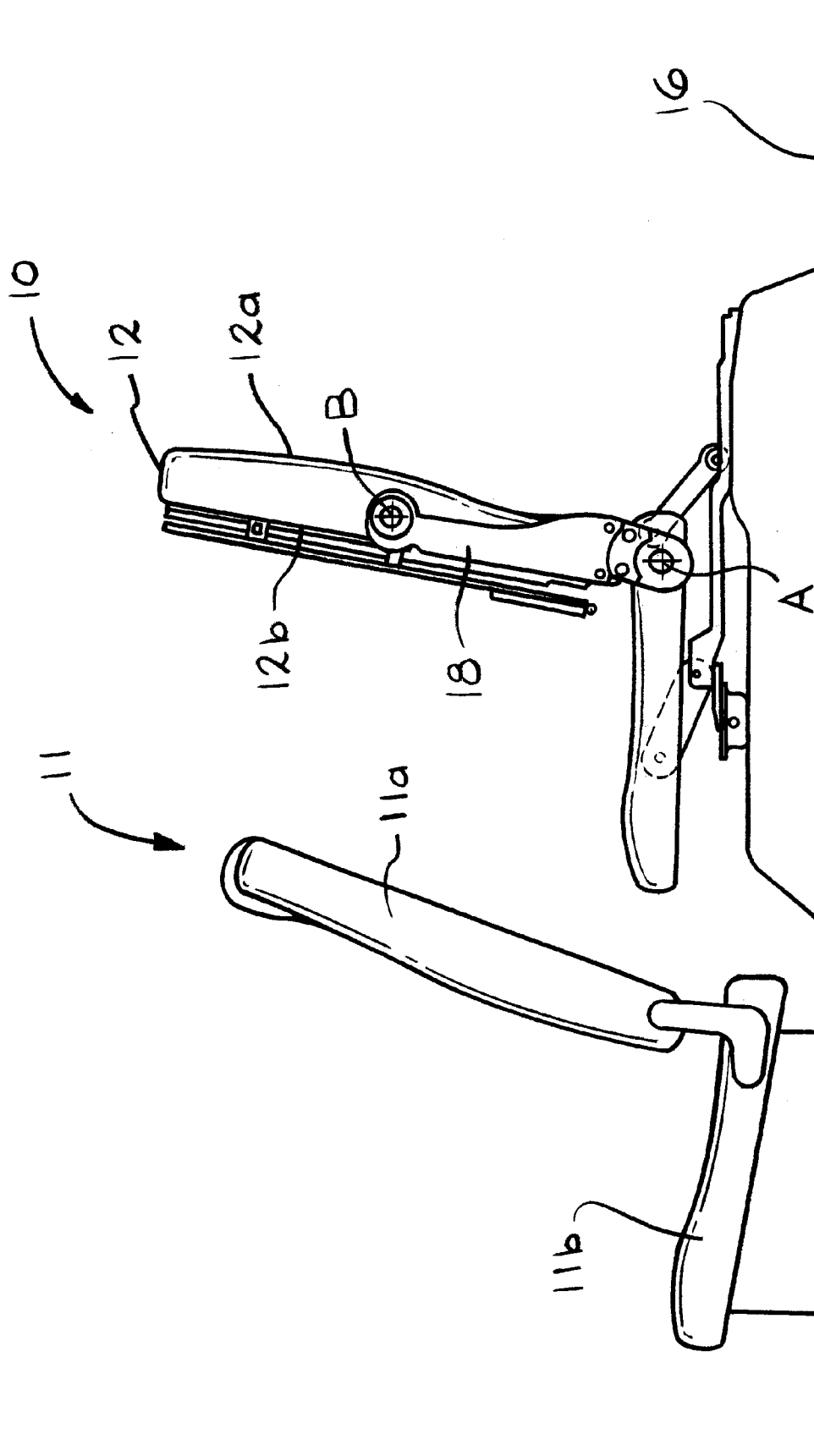

The sequence of moving the seats 10 and 12 to create the load floor 20 will now be described. The seats 10 and 12 can be configured to be moved manually, by motorized mechanisms, or by any combination thereof. As shown in FIG. 2, the seat backs of the seats 10 and 11 are in their upright positions to provide seating areas for vehicle occupants. To place the seat 10 into a storage position to create a portion of the load floor 20, the longitudinal mechanism 40 is preferably engaged to move the seat bottom 14 from its normal seating position, as shown in FIG. 2, to its forward and/or lowered position, as shown in FIG. 3. More specifically, the first and second links 44 and 46 are rotated in a counter-clockwise rotation, as viewing FIGS. 2 and 3, about their pivot points relative to the mounting bracket 42. Preferably, the seat back 12 is next rotated about axis B to so that the front portion 12*a* generally faces the rear of the vehicle and the rear portion 12*b* generally faces the front of the vehicle, as shown in FIG. 4. For the embodiment illustrated in FIGS. 3 and 4, the seat back 12 is rotated about 180 degrees, since the front portion 12*a* of the seat back 12 is generally opposite the rear portion 12*b*, and the side arms 18 extend generally parallel with the sides of the seat back 12. Of course, the seat back 12 can be rotated to any suitable position. It should be understood that the seat back 12 can be rotated about any suitable rotational degrees, such as between about 150 degrees to about 210 which generally rotates the seat back 12 around in an opposite orientation such that front portion 12*a* and the rear portion 12*b* are revered. The side frames 18 are rotated about axis A in a clockwise rotation, as viewing FIG. 4, to move the seat back 12 into its lowered position, as shown in FIG. 5. Preferably, the seat back 12 is in a generally horizontal orientation when in its fully lowered position.

After the seat back 12 is in its lowered position, as shown in FIG. 5, the panels 28 and/or 30 are preferably moved to positions which cover the seat bottom 14 and bridge the gap between the seat 10 and the seat 11, as shown in FIG. 8. The panels 28 and 30 cooperate with the fixed backing panel 26 to provide the relative flat horizontal load floor 20, wherein cargo can be placed thereon without coming into contact with the seating trim material of the seat 12. In the embodiment of the seat 10 illustrated in FIGS. 1 through 8, the extension panel 28 is moved from its normal or non-extended position, as shown in FIGS. 5, to its fully extended position, as shown in FIG. 7, by a sliding motion. Note that FIG. 6 shows the extension panel 28 being moved in transition between its normal and extended positions. Details of the movement of the extension panel 28 will be explained below with respect FIGS. 12 and 13. It should be understood that the panel 28 may be moved between its normal and extended positions by any suitable movement, such as for example, by pivoting the panel 28 over end.

As shown in FIG. 8, the seat back 11*a* of the seat 11 may be reclined to its forward position, and the optional flip panel 30 of the panel assembly 22 may be rotated into an extended position outwardly from the free end 32 of the extension panel 28 to generally bridge the gap between the seat bottom 28 of the seat 10 to the rear portion of the seat 11. Thus, the load floor 20 can be extended even further by being further defined by the flip panel 30 and the seat back 11*a* of the seat 11.

Any of the above steps can be performed at any suitable sequence or simultaneously with one another. Preferably, the various pivot and hinge points of the seat 10 and 11 are lockable so that the seats 10 and 11 and the panels 28 and 30 remain in their respective positions when in their seating positions, as shown in FIG. 2. The various pivot points and hinge points can also include suitable latches and catches or include self-locking mechanisms for this purpose. To return the seats 10 and 11 to their upright positions, the steps as described above can be reversed. Although FIGS. 2–8 represent a preferred sequence of moving the seats 10 and 11 from their seating to their storage positions, it should be understood that the seats 10 and 11 may be moved in any desirable sequence and may also be moved simultaneously. For example, the seat back 12 may rotate about the axis B and simultaneously the longitudinal mechanism 40 may be actuated to move the seat bottom 14 forward.

Figure 9:
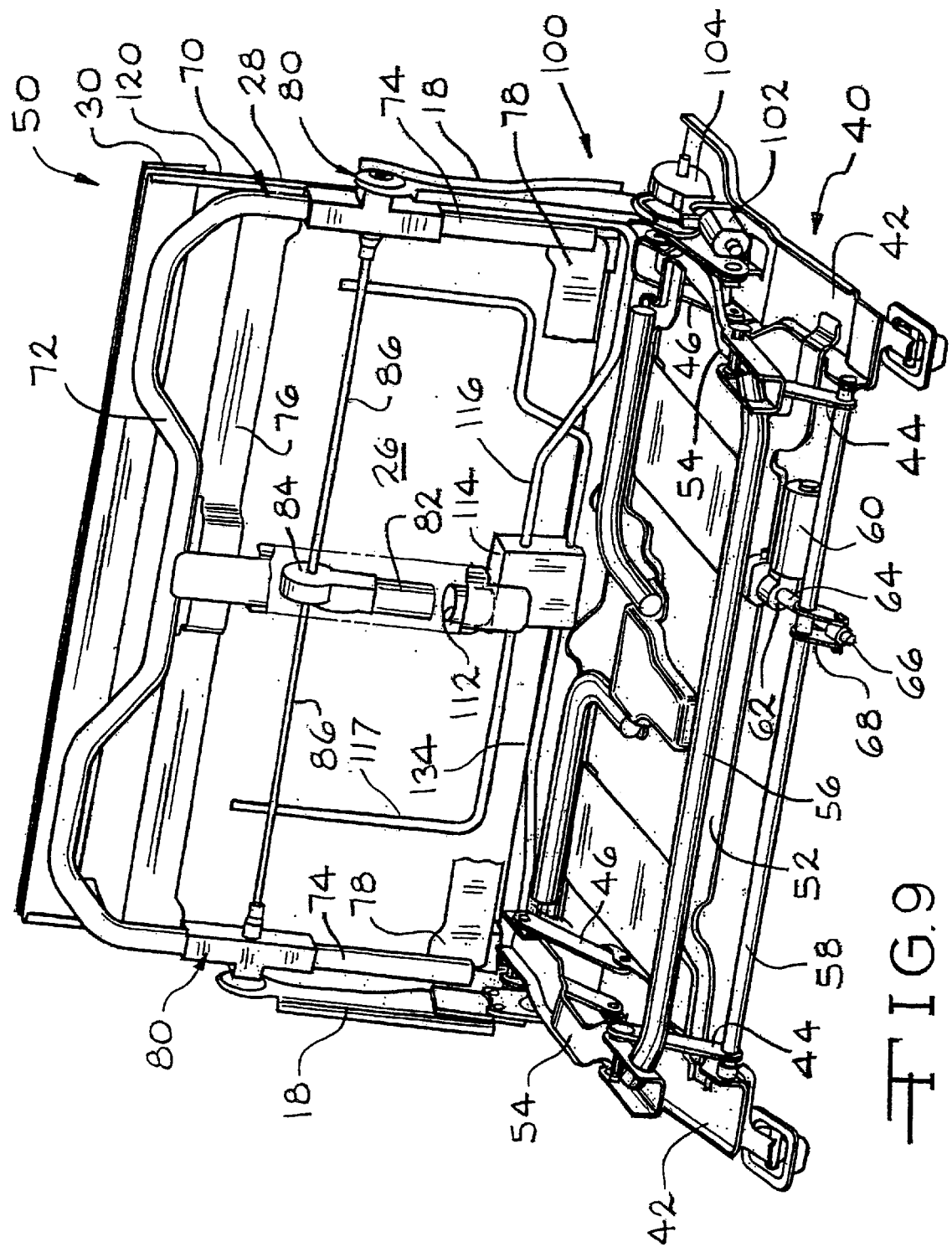
FIG. 9 is a perspective view of a frame structure of the seat of FIG. 1.
Figure 10:
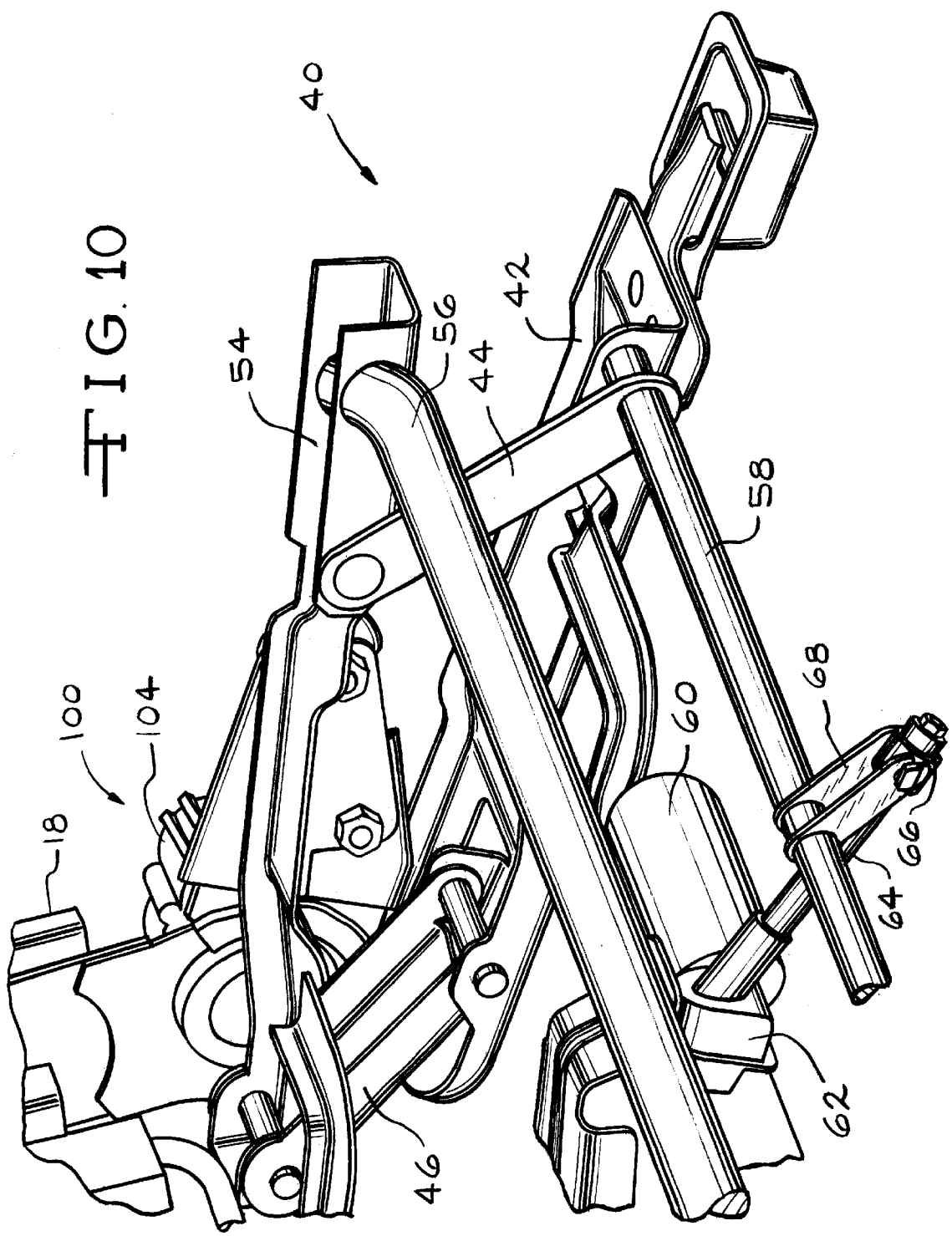
FIG. 10 is an enlarged perspective view of a portion of the frame structure of FIG. 9.

There is illustrated in FIGS. 9 and 10 a preferred frame structure, indicated generally at 50, for the seat 10 of FIGS.

1 through 8. The frame structure 50 includes the longitudinal movement mechanism 40 schematically illustrated in Figs. 2 through 8. Specifically, the mechanism 40 includes a pair of mounting brackets 42 preferably mounted to the vehicle floor 16. A intermediate framework 52 extends between the mounting brackets 42. The mounting brackets 42 and framework 52 can be made of any suitable material, such as stapled sheet metal and/or tubular members. The mechanism 40 includes a pair of first links 44 pivotally connected between the mounting brackets 42 and a pair of seat brackets 54, respectively. The seat brackets 54 are preferably fastened to the seat bottom 14 or a framework (not shown) of the seat bottom 14. A pair of second links 46 also are pivotally connected between the mounting brackets 42 and the seat brackets 54. A cross member 56 connects the pair of seat brackets 54 at front portions thereof. The mechanism 40 also preferably includes a rod 58 rotatably mounted between the mounting brackets 42. The first links 44 are fixedly secured to the rod 58 and rotate therewith. As stated previously, the mechanism 40 can be manually operated. Alternatively, the mechanism 40 as illustrated in FIGS. 9 and 10, can include a motor 60 to provide rotational movement of the links 44 and 46. The motor 60 is coupled to a gear box 62 which translate the rotary output of the motor 60 into linear motion of a rod 64. An end 66 of the rod 64 is pivotally connected to an arm 68 fixedly secured to the rotatable rod 58.

To actuate the mechanism 40, the motor 60 is engaged causing liner motion of the rod 64. The linear motion of the rod 64 causes rotation of the rod 58 via the arm 68 which causes rotation of the links 44 and 46. Rotation of the links 44 and 46 causes the seat bottom 14 to move between its normal position, as shown in FIG. 2, to its forward and lowered position, as shown in FIG. 3. The rotational direction of the motor 60 can be reversed to rotate the links 44 and 46 in the opposite direction.

Referring to FIG. 9 again, the frame structure 50 includes a back frame 70 to provide structural rigidity to the seat back 12. The back frame 70 can be any suitable structure. As shown in the embodiment of the back frame 70 illustrated in FIG. 9, the back frame 70 includes a generally U-shaped tubular member 72 defining a pair of legs 74 connected together by a pair of cross members 76 and 78. Note that the cross member 78 is shown broken in FIG. 9 for clarity of mechanisms therebehind. The backing panel 26 of the panel assembly 22 is preferably mounted on the back frame 70. The back frame 70 preferably includes a pair of pivot mechanisms 80 mounted on either side of the back frame 70. The pivot mechanisms 80 rotatably mount the back frame 70 to the side arms 18 at a pivot corresponding to the axis B of FIG. 1. Although the pivot mechanisms 80 can be configured to be manually operated, the pivot mechanisms 80 preferably include a motor 82 to provide rotational movement of the back frame 70. The motor 82 is coupled to a gear box 84 which is coupled to a pair of rotatable rods or cables 86. Ends 88 of the cables 86 are coupled to the pivot mechanisms 80. To actuate the pivot mechanisms 40 to rotate the seat back 14 relative to the side arms 18, the motor 82 is engaged causing rotary motion of the cables 86. The rotary motion of the cables 86 causes the pivot mechanisms 80 to rotated the back frame 70 relative to the side arms 18. The rotational direction of the motor 82 can be reversed to rotate the back frame 70 in the opposite direction.

Figure 11:
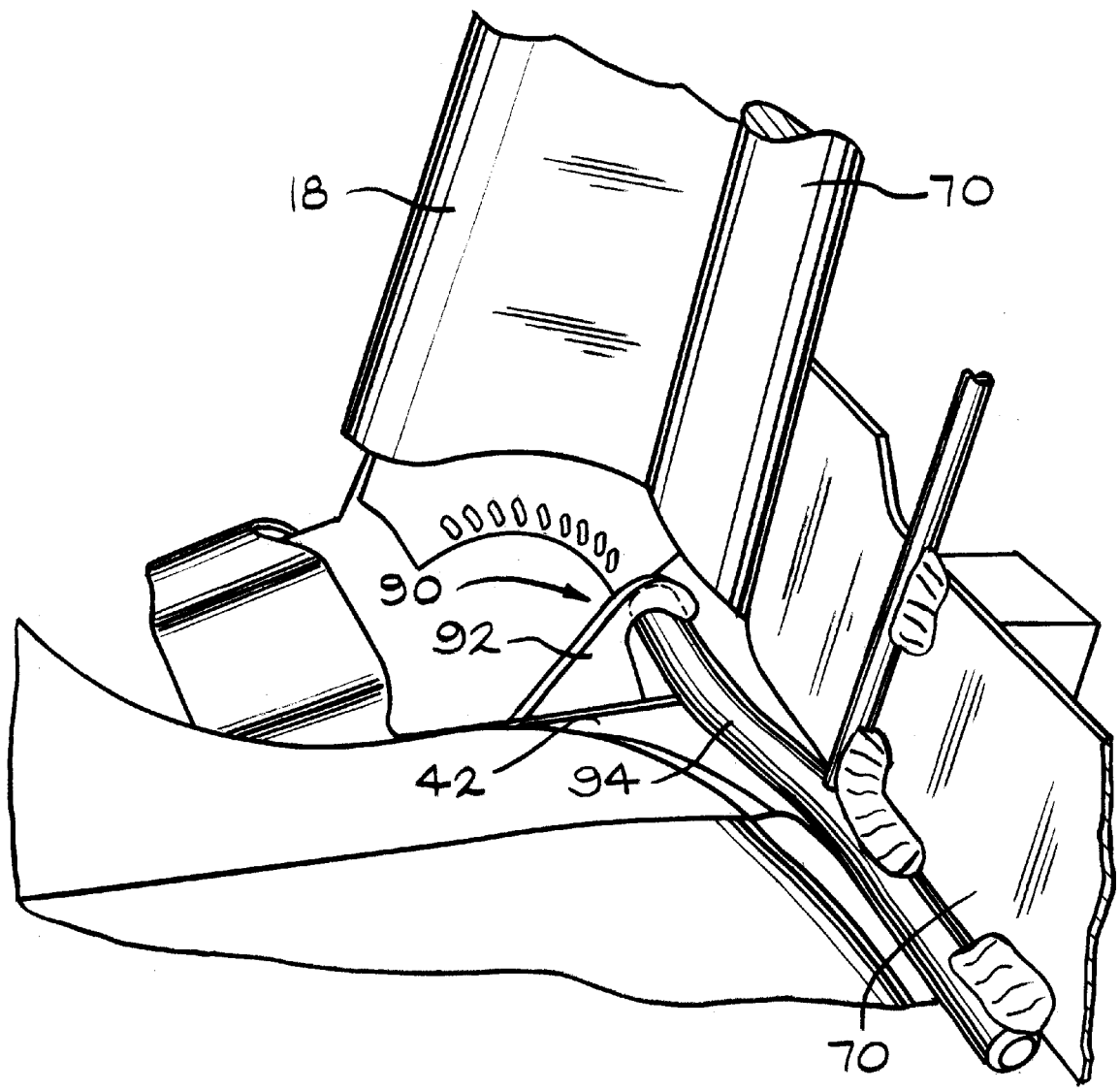
FIG. 11 is an enlarged perspective view of another portion of the frame structure FIG. 9.

When the seat back 12 is in its normal seating position as shown in FIGS. 1 through 3, the frame 50 preferably includes a stop, indicated generally at 90 in FIG. 11, to prevent rotation of the back frame 70. The stop 90 can be located anywhere on the seat back 12, such as in the right bottom corner of the seat back 10, as shown in FIG. 11. The stop 90 can be any suitable structure to prevent rotation of the back frame 70. For example, the stop 90 can include a hook member 92 attached to one or both of the mounting brackets 42. The hook member 92 cooperates with a rod 94 attached to the back frame 70. When the seat back 12 is rotated back into its seating position, the rod 94 will contact the hook member 92, thereby preventing further rotation of the seat back 12.

The side arms 18 are preferably pivotally connected to the pair of mounting brackets 42 by a recliner mechanism, indicated generally at 100 in FIG. 9, at a pivot corresponding to the axis A of FIG. 1. Although the recliner mechanism 100 can be configured to be manually operated, the recliner mechanism 100 preferably includes a motor 102 to provide rotational movement of the side arms 18 relative to the mounting brackets 42 of the seat bottom 14. The motor 102 is coupled to a gear box 104 which is coupled to an end 106 of one of the side arms 18. Note that the other side arm 18 can be simply pivotally mounted to the corresponding mounting bracket 42 or can also include a recliner mechanism 100.

Figure 12:
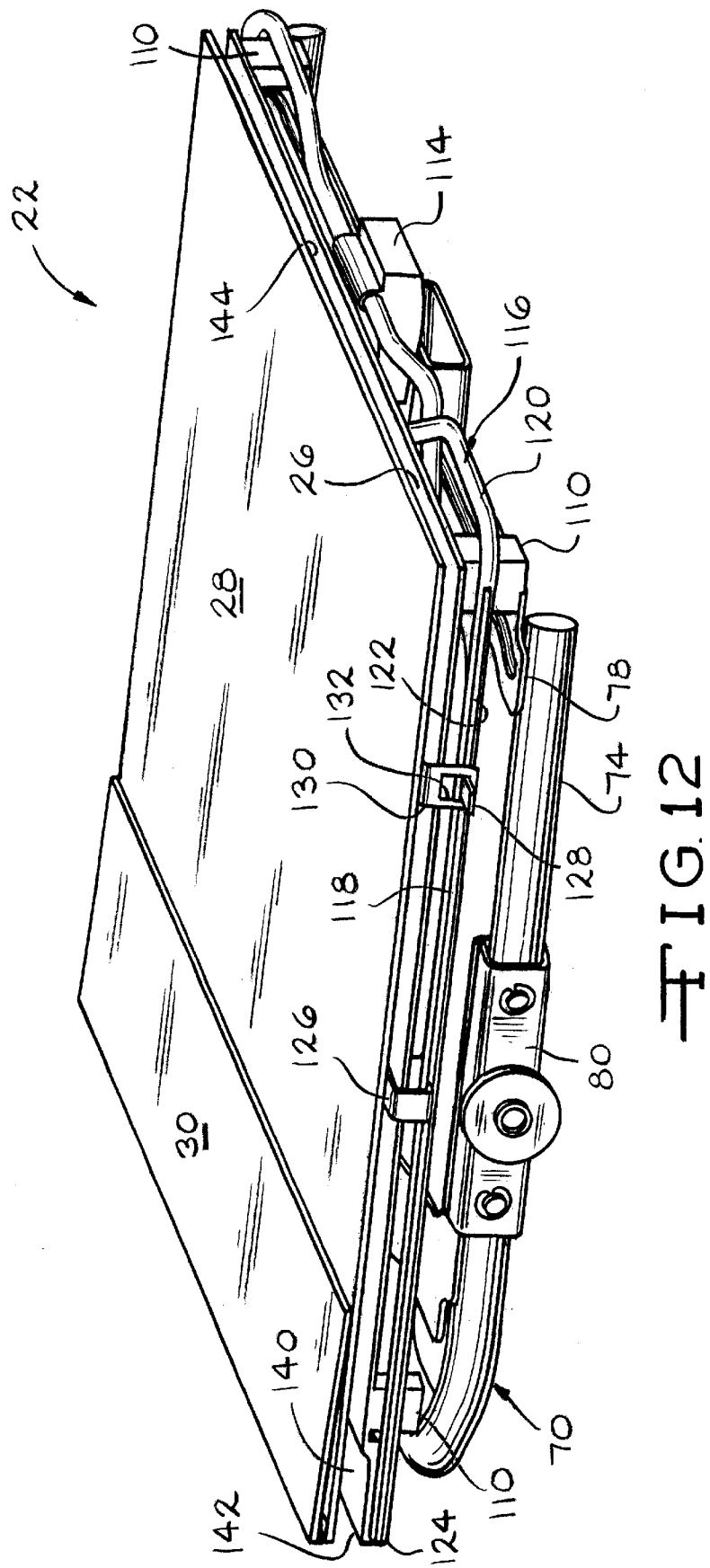
FIG. 12 is a perspective view of the back portion of the frame of FIG. 9.
Figure 13:
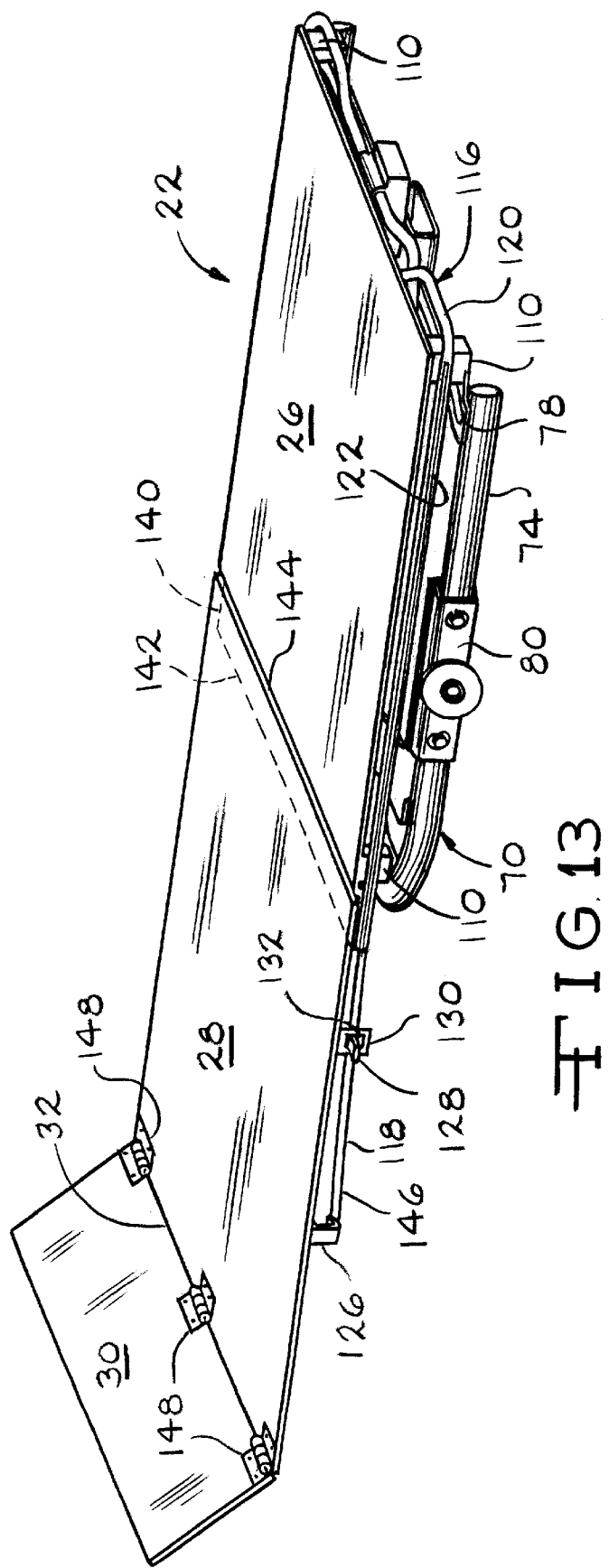
FIG. 13 is a perspective view of the back portion of FIG. 12, wherein the panels are shown in the extended position.

The frame structure 50 also includes the panel assembly 22, as best shown in FIGS. 9 and 12–13. The panel assembly 22 includes a mounting assembly having the fixed backing panel 26. The fixed backing panel 26 is preferably mounted on the back frame 70, such as by a plurality of corner posts 110. Although the panel assembly 22 could be configured to be manually operated, the panel assembly 22 preferably includes a motor 112 to provide the translational movement on the extension panel 28 relative to the backing panel 26. The motor 112 is coupled to a transmission 114. A first tubular sheath 116 extends through the transmission 114. The sheath 116 includes a first portion 117 extending from one end of the transmission 114, and a second portion 120 extending from the other side of the transmission 114 and extending along the sides of the back frame 70. As best shown in FIGS. 12 and 13, the second portion 120 of the sheath 116 includes an elongated slot 122 extending from a free end 124 of the second portion 120 of the sheath 116 along generally the entire side of the back frame 10. A flexible cable 118 is disposed in the sheath 116. The cable 118 is coupled to the transmission box 114 such that operation of the motor 112 causes translational movement of the cable 118 within the sheath 116. One end of a C-shaped member 126 is fixedly connected to the cable 118. The member 126 extends through the slot 122 of the sheath 116 and can slide relative to the sheath 16 when the cable 118 moves within the sheath 116. The other end of the C-shaped member 126 is secured to the extension panel 28. The C-shaped member 126 slightly spaces the extension panel 28 from the sheath 116. A tab 128 is also fixedly secured to the cable 118. The tab 128 extends through the slot 122 of the sheath 116 and can slide relative to the sheath 116 when the cable 118 moves within the sheath 116. A slotted member 130 is secured to the extension panel 28 and includes slot 132 through which the tab 128 extends. The slot 132 provides for a slight vertical clearance between the tab 128 and the extension panel 28. Although the panel assembly could operate with a single sheath 116 and cable 118 attached on side thereof, the panel assembly 22 preferably includes a second sheath 134 and cable (not shown) on the other side of the back frame 70. The second sheath 134 and cable are functionally and structural similar to the sheath 116 and cable 118. The sheath 116 includes a first portion 118 extending from one end of the transmission 114, and a second portion 120 extending from the other side of the transmission 114 and extending along the sides of the back frame 70. As best shown in FIGS. 12 and 13, the second portion 120 of the sheath 116 includes an elongated slot 122 extending from a free end 124 of the second portion 120 of the sheath 116 along generally the entire side of the back frame 10. A flexible cable 118 is disposed in the sheath 116. The cable 118 is coupled to the transmission box 114 such that operation of the motor 112 causes translational movement of the cable 118 within the sheath 116. One end of a C-shaped member 126 is fixedly connected to the cable 118. The member 126 extends through the slot 122 of the sheath 116 and can slide relative to the sheath 16 when the cable 118 moves within the sheath 116. The other end of the C-shaped member 126 is secured to the extension panel 28. The C-shaped member 126 slightly spaces the extension panel 28 from the sheath 116. A tab 128 is also fixedly secured to the cable 118. The tab 128 extends through the slot 122 of the sheath 116 and can slide relative to the sheath 116 when the cable 118 moves within the sheath 116. A slotted member 130 is secured to the extension panel 28 and includes slot 132 through which the tab 128 extends. The slot 132 provides for a slight vertical clearance between the tab 128 and the extension panel 28. Although the panel assembly could operate with a single sheath 116 and cable 118 attached on side thereof, the panel assembly 22 preferably includes a second sheath 134 and cable (not shown) on the other side of the back frame 70. The second sheath 134 and cable are functionally and structural similar to the sheath 1 16 and cable 118.

To operate the panel assembly 22 to move the extension panel 28 from its normal position, as shown in FIGS. 5 and 12, to its extended position, as shown in FIGS. 7 and 13, the motor 112 is actuated to cause the transmission 114 to feed the cable 118 in a direction out through the free end 124 of the sheath 116, or leftward in the second portion 120 of the sheath 116 as viewing FIGS. 12 and 13. Movement of the cable 116 also causes movement of the C-shaped member 126 and the tab 128. Since the member 126 and the tab 128 are fixed to the extension panel, movement of the member 126 and tab 128 causes the extension panel 28 to move relative to the backing panel 26 towards its extended position., until the extension panel 28 reaches its outermost position, as shown in FIG. 13. Preferably, the backing panel 26 includes a recess 140 at an end 142 thereof, so that an end 144 of the extension panel 28 can move downward, as viewing FIG. 13, into the recess 140 to a flush position relative to the backing panel 26. Thus, the majority of the surfaces of the panels 26 and 28 are generally co-planar with each other to form a continuous flat load floor. Preferably, the cable 118 includes a curved portion 146 at an end portion 148 thereof to assist in drawing the extension panel 28 downward. Note that the cable 118 can be a multiple piece made of a flexible portion which is fed through curved portions of the sheath 116, and a stiffer portion, such as a metal rod, at its curved portion 146. The slot 132 in the slotted member 130 provides clearance so that the curved portion 146 of the cable 118 can move closer to the extension panel 28 when in its furthermost extended position.

The panel assembly 22 may include the optional flip panel 30 which is hinged to the end 32 of the extension panel 28. The flip panel 30 may include a spring mechanism or actuator (not shown) which automatically flips the flip panel 30 into its extended position when the extension panel 28 is in its extended position.

The seat 12 may include any suitable manually operated or power actuated mechanisms, such as the motors 60, 84, 102, and 112, to move the seat through its sequence of movements as described above.

Figure 14:
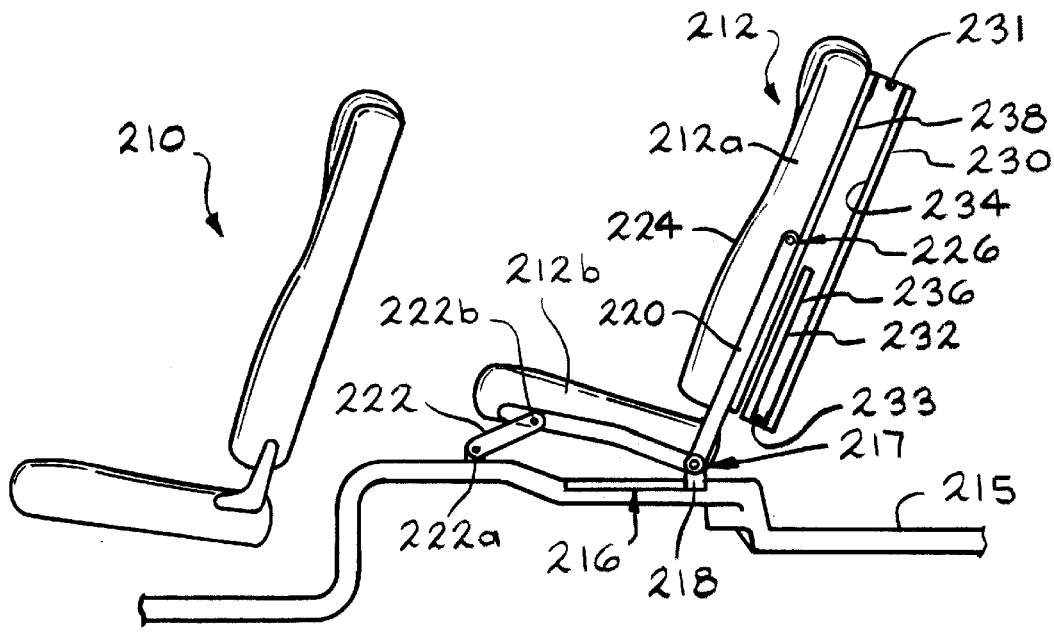
FIGS. 14 and 15 are schematic side elevational views of a second embodiment of a vehicle seat, in accordance with the present invention, illustrating sequential movement of the seat from its upright position to its lowered position to form a generally horizontal flat load floor.
Figure 15:
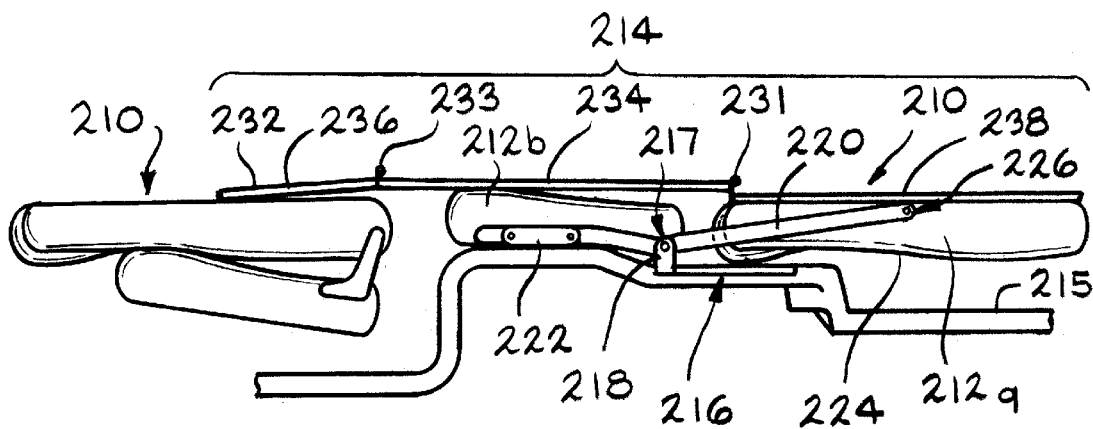

There is schematically illustrated in FIGS. 14 and 15 a second embodiment of a vehicle seat, indicated generally at 212, which unfolds in a manner with a second seat 210 to create a relatively flat load floor, indicated generally at 214, as shown in FIG. 15.

The seat 212 includes a seat back 212a and a seat bottom 212b. A rear portion of the seat bottom 212b is pivotally attached to a pair of track assemblies 216 for fore and aft movement, the reason for which will be described below. Any suitable track mechanism 216 can be used. A portion of the track assemblies 216 are fixed to a vehicle floor 215. Brackets 218 are slidably mounted along the length of the tracks 216 and are pivotally attached to rear portions of the seat bottom 212b and lower portions of a pair of side frames 220 of the seat back 212a. The bracket 218 incorporates a recliner mechanism 217 to provide rotational movement of the seat back 212a relative to the seat bottom 212b. A pair of opposed links 222 have ends 222a pivotally attached to the vehicle floor 215, and ends 222b pivotally attached to the seat bottom 210b. The seat back 212a includes the pair of side frames 220 and a seating or central portion 224 extending therebetween. A pair of pivot mechanisms 226 pivotally attach the central portion 224 to the side frames 220.

A first panel 230 is pivotally attached to the central portion 224 of the seat back 212a at a hinge 231. A second panel 232 is pivotally attached to the first panel 230 at a hinge 233. The first and second panels 230 and 232 and the central portion 224 of the seat back 212a include carpeted surfaces 234, 236, and 238 respectively, which form the exposed upper surface of the load floor 214. Note that the carpet or other trim materials of the surfaces 234, 236, and 238 may form the hinges 231 and 233. Note that the first and second panels 230 and 232 are preferable flush to the seat back 212a, and are shown schematically spaced therefrom for clarity purposes only.

The sequence of moving the seats 210 and 212 to create the load floor 214 will now be described. The seats 210 and 212 can be moved manually or by any suitable power actuated mechanisms or by any combination thereof. As shown in FIG. 14, the seats 210 and 212 are in their upright positions for normal seating. The seat 212 is advanced forward along the track assemblies 216 to the position shown in FIG. 15. Note that the forward movement of the seat 212 causes the links 222 to drop the front edge of the seat bottom 212b to a lower position, as shown in FIG. 15. The central portion 224 of the seat back 212b is preferably then rotated approximately 180 degrees about the pivot mechanism 226. The side frames 220 along with the central portion 224 are then pivoted about the recliner mechanism 217 to a lowered position, as shown in FIG. 15. The panels 230 and 232 are then flipped to the positions shown in FIG. 15. Note that the seat back 210b of the seat 210 may be pivoted forward so that the panel 232 can be laid on top. If desired, the seat back 210a can be left in its upward position, and the panel 232 simply positioned generally vertically adjacent the seat back 210a.

Any of the above steps can be performed at any suitable sequence or simultaneously with one another. Preferably, the various pivot and hinge points of the seat are lockable so that the seats 210 and 212 and the panels 230 and 232 remain in their respective positions when in their seating positions, as shown in FIG. 14. The various pivot points and hinge points can include any suitable latch, catch, or self-locking mechanisms for this purpose. To return the seats 210 and 212 to their upright positions, the steps as described above can be reversed.

Figure 16:
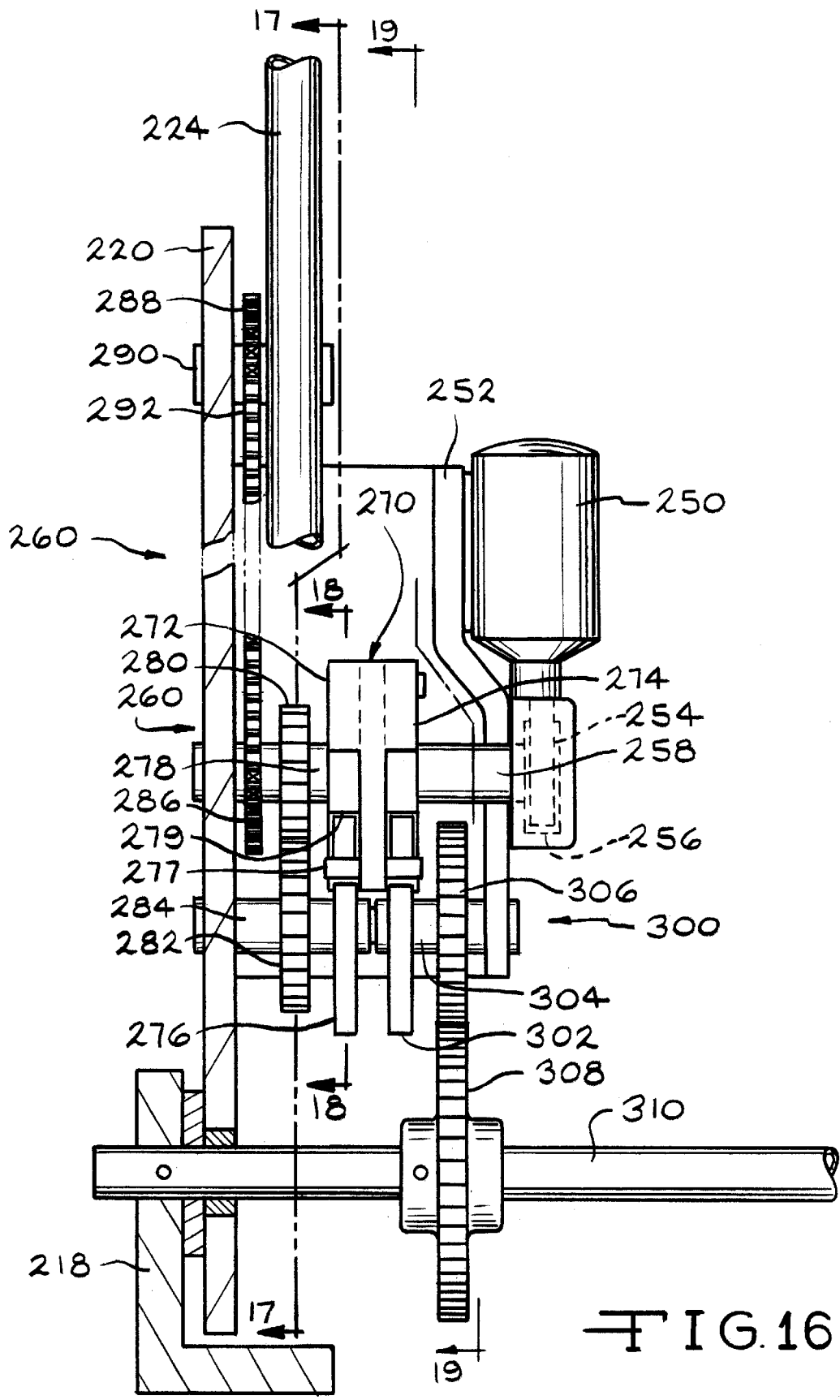
FIG. 16 is a front elevational view, partially in section, of a side portion of a frame structure for the seat of FIGS. 14 and 15.
Figure 19:
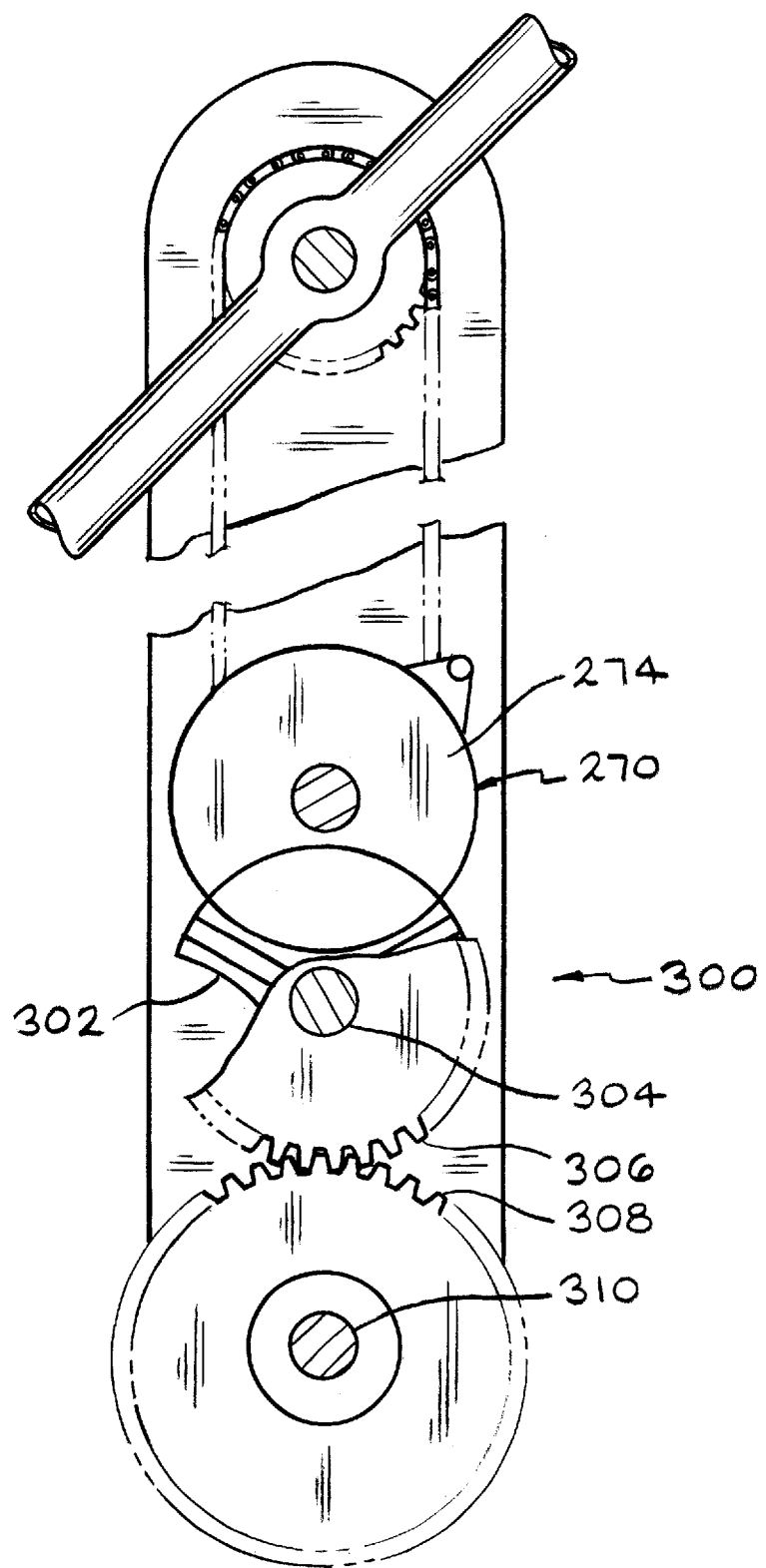
FIG. 19 is a sectional view taken along Lines 19—19 of FIG. 16.

FIGS. 16 though 19 include embodiments of the various structures of the seat 212 and interior of the vehicle for power actuated operation thereof. Like reference numbers will be used for similar structures. Preferably, a single electric motor 250 is used to perform the entire power actuated movement of the seat 212 and panels 230 and 232 from their seating positions (FIG. 14) to their lowered positions (FIG. 15) to form the relatively flat load floor 214. FIG. 16 is a partial cross-sectional view of one side of the seat back 212a. The motor 250 is supported on a bracket 252 extending from the side frame member 220. The motor 250 drives a worm 254 engaged with a mating worm gear 256. The worm gear 256 drives a shaft 258 rotatably mounted on the bracket 252. Note that the engagement and pitch of the worm 254 and the worm gear 256 are preferably mating in a self-locking arrangement, such that the worm gear 256 cannot be rotated to cause rotation of the worm 254.

A pivot mechanism, indicated generally at 260, can be used for the pivot mechanism 226 of FIGS. 14 and 15. The pivot mechanism 260 provides means for moving or flipping the central portion 224 of the seat back 212a. The pivot mechanism 260 preferably includes a Geneva wheel and crank mechanism, also known as a Maltese cross. A Geneva driver cylinder 270 is mounted on the shaft 258 for rotation with the worm gear 256. The Geneva driver cylinder 270 has two faces which function as two Geneva cranks 272 and 274. The Geneva crank 272 cooperates with a three slotted first Geneva wheel 276. A pin 277 extends from the Geneva crank 272 and selectively rides in slots 279 formed in the first Geneva wheel 276. The first Geneva wheel 276 is mounted on and fixed to a shaft 278. The shaft 278 is rotatably mounted on the side frame 220 and has a gear 280 mounted thereon. The gear 280 meshes with a gear 282 which is rotatably mounted on a shaft 284. The shaft 284 is rotatably mounted on the side frame 220. Note that the shaft 258 and the shaft 278 rotate independently of each other. A first sprocket 286 is mounted on the shaft 278 for rotation therewith. A second sprocket 288 is mounted on a shaft 290. The shaft 290 is rotatable mounted on the side frame 220. An end of the shaft 290 is fixed to a frame member of the central portion 224 of the seat back 212a. The first and second sprockets 286 and 288 are rotatably mated by a chain 292.

To rotate the central portion 224 of the seat back 212a, the motor 250 is actuated to drive the worm 254, which drives the worm gear 256, which rotates the Geneva driver cylinder 270. The pin 277 of the Geneva crank 272 of the Geneva driver cylinder, rotates about the axis of the Geneva crank 272 and rides within an appropriate slot 279 of the Geneva wheel 276. The movement of the pin 277 within a slot 279 causes the Geneva wheel 276 to rotate. The pin 277 will ride along the length of the slot 279 as the pin causes rotation of the Geneva wheel 276. Note that placement of the relative positions of the pin 277 of the Geneva wheel 276 and the Geneva crank 272 are illustrated at either the beginning or end of a portion of the movement cycle of the Geneva wheel 276. The Geneva crank 272 includes an arcuate recess 293 to provide clearance for the Geneva wheel 276. Rotation of the Geneva wheel 276 rotates the gear 282 which rotates the gear 280. Rotation of the gear 280 causes rotation of the first sprocket 286. Rotation of the first sprocket 286 drives the chain 292 causing rotation of the second sprocket 288. The rotation of the second sprocket 288 rotates the shaft 290 which rotates the central portion 224 of the seat back 212a.

Note that the Geneva crank and wheel mechanism is a self-locking arrangement such that the Geneva wheel cannot be rotated to cause rotation of the Geneva crank 272 once the pin is out of engagement with the slot 279. Also the engagement of the worm 254 and the worm gear 256 are self-locking such that the central portion 224 is locked into position if a force is acting thereon, such as by the weight of an occupant of the seat 212. Thus, a latch mechanism may not required for the pivot mechanism 260.

A recliner mechanism, indicated generally at 300, can be used for the recliner mechanism 217 of the bracket 218 to move the side frames 220 from an upright position as shown in FIG. 14 to a reclined position, as shown in FIG. 15. The recliner mechanism 300 includes the Geneva crank 274 which is driven by the motor 250. Although the Geneva crank 272 and 274 are shown approximately 180 degrees apart, they can have any suitable rotational relationship with one another. The 180 degree relationship provides that one of the operations will be performed and completed prior to the start of the other operation. If desired, the Geneva cranks 272 and 274 can be formed as separate structures. The Geneva crank 274 engages a Geneva wheel 302 in a similar engagement as the Geneva crank 272 and wheel 276 described above. The Geneva wheel 302 is rotatably mounted on a shaft 304 rotatably mounted on the bracket 252. Note that the shafts 304 and 284 rotate independently from each other. A gear 306 is mounted on the shaft 304. The gear 306 meshes with a gear 308. The gear 308 is fixed to a beam 310 which extends to the other side of the seat back 212a. The beam 310 is fixed with respect to the bracket 218 which rides along the track assembly 216.

To rotate the side frame 220, the motor 250 is actuated to drive the worm 254, which drives the worm gear 256, which rotates the Geneva crank 274 of the Geneva driver cylinder 270. The Geneva crank 274 causes the Geneva wheel 302 to rotate which rotates the gear 306. Rotation of the gear 306 causes the side frame 220 to rotate about the fixed gear 308.

It is desirable to disengage the motor 250 if the seat 212 or panels 230 and 232 are unable to be moved from their respective positions, for example, if an obstacle is in the way or an occupant is seated in the seat 212. For example, the seat can include sensors to sense an occupant. The motor 250 can be equipped with a voltage regulator to stall the motor if an abnormal reading is detected, such as is used in power windows. Therefore, no electronic control may be required. If multiple motors are used to control the rotation of the various seat structures and panels, a suitable electronic control circuit can be used.

Figure 20:
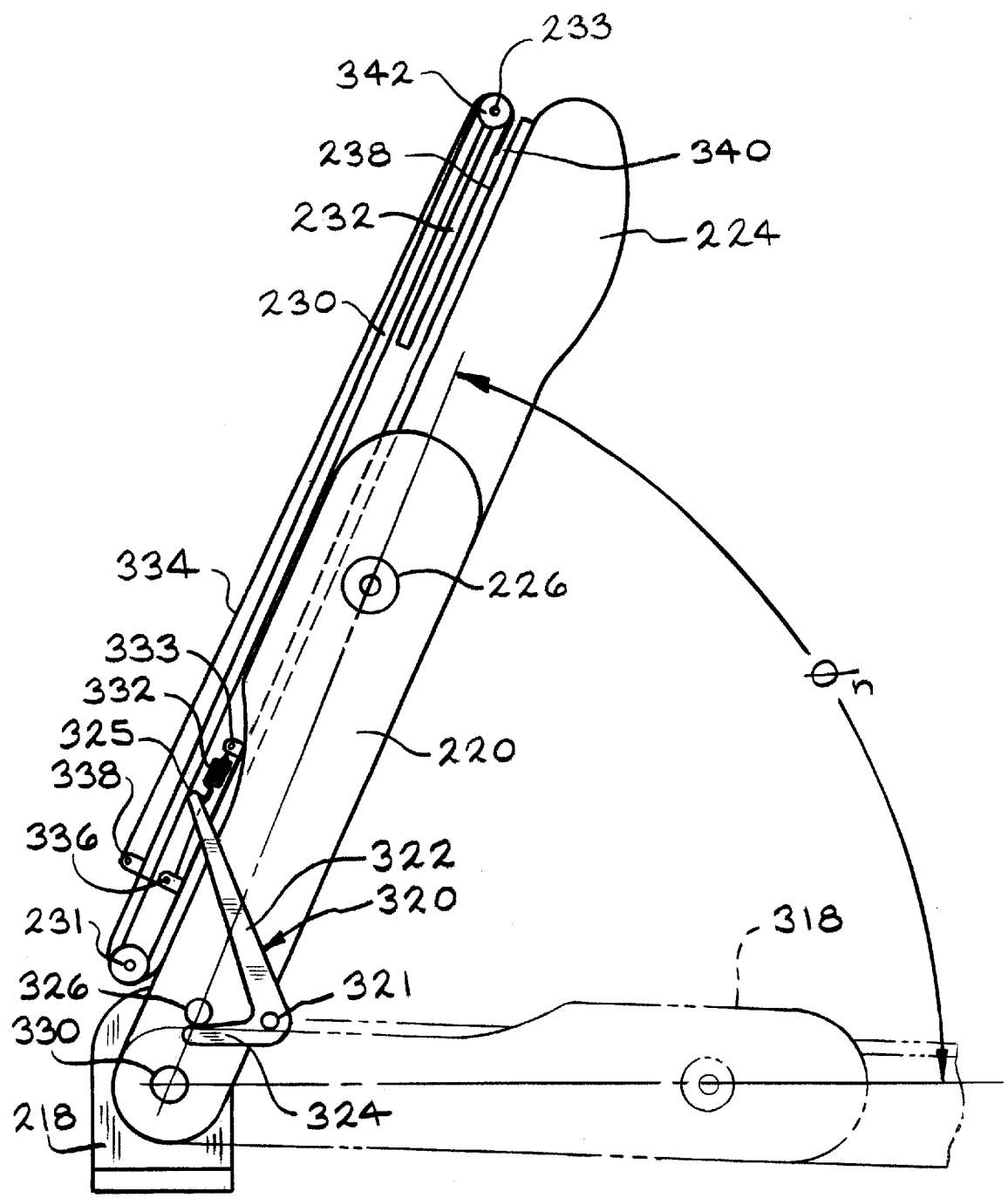
FIG. 20 is a schematic side view of a third embodiment of vehicle seat, in accordance with the present invention.
Figure 21:
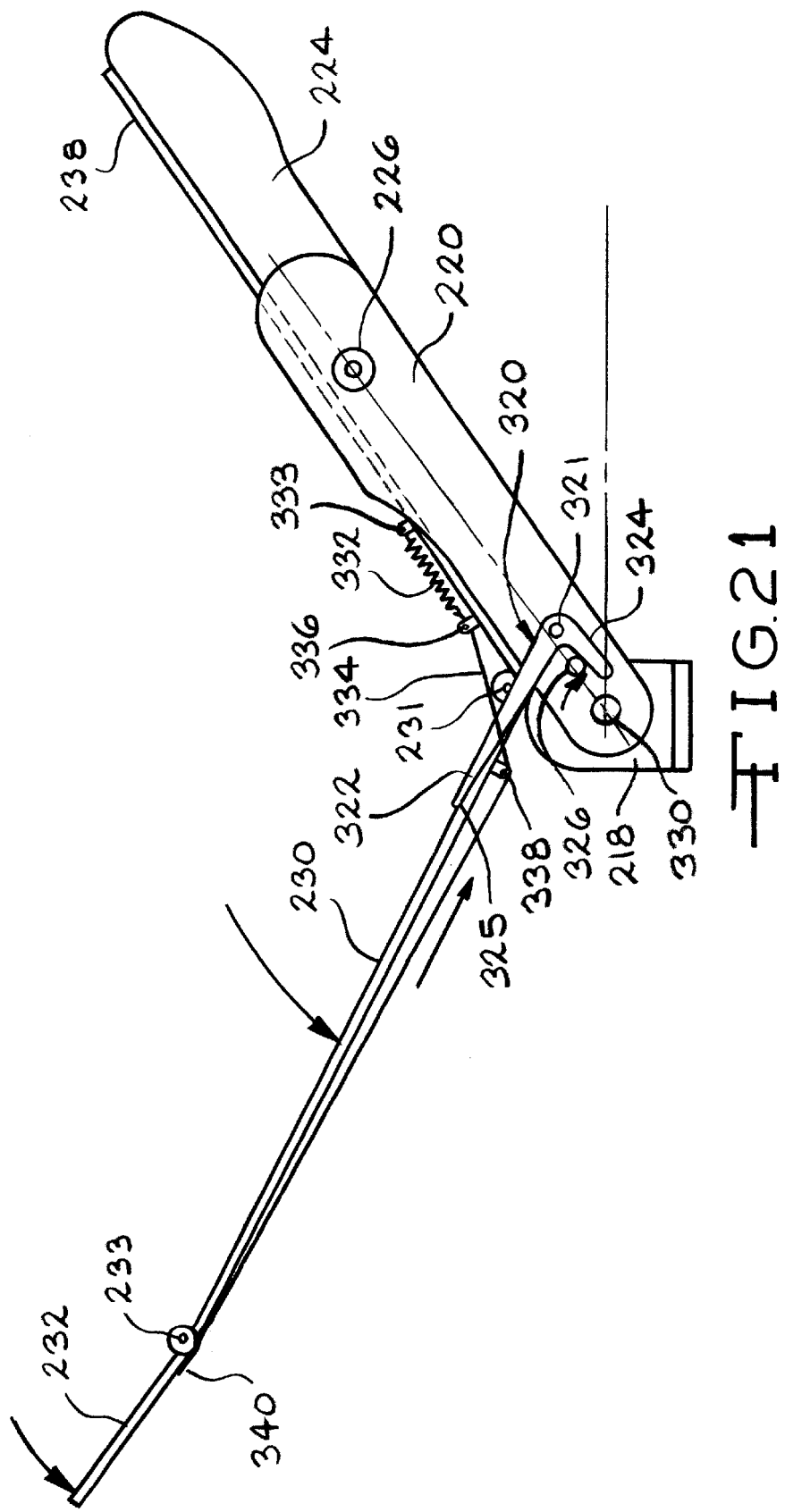
FIG. 21 is a schematic side view of the seat of FIG. 20 illustrating movement of the seat into a lowered position.

There is illustrated in FIGS. 20 and 21 an embodiment of a frame structure for the seat 212 and panels 230 and 232, in which the panels 230 and 232 are deployed as described above automatically by the rotation of the side frame 220. Like reference numbers will be used for similar structures. The panel 230 is pivotally connected to the seat back 212a at the hinge 231. The panel 232 is pivotally connected to the panel 230 at the hinge 233. Preferably, the hinges 231 and 233 include springs, such as helical springs, to bias the panels 230 and 232 in their folded positions against the seat back 212a, as shown in FIG. 20.

FIG. 20 also shows the side frame 220 in a lowered position as represented by broken lines 318, having been rotated by an angle $\emptyset_n$. A pair of bell cranks 320 are pivotally attached to the respective brackets 218 at a pivot 321. The bell cranks 320 have a first leg 322 and a second leg 324. The first leg 322 has an end 325 which engages the panel 230. The second leg 324 engages with a pin 326 extending from the side frame 220. The side frame 220 rotates about the bracket 218 at a pivot 330.

As best shown in FIG. 21, a spring 332 is attached to the central portion 224 at an attachment point 333. The spring 332 can be any suitable spring structure, such as a coil spring or a stack of Belleville washers. The spring 332 is attached to a cable 334. The cable 334 is guided around a guide 336 attached to the central portion 224 of the seat back. The cable 334 is also guided around a guide 338 attached to the panel 230. The cable 334 extends along the panel 230 and attached to the panel 232 at a fastening point 340. The hinge assembly 233 preferably includes a generally circular sheave 342. The cable 334 extends along the outer periphery of the sheave 342. Preferably, the hinges 231 and 233 have covers, such as elastomeric boots. Preferably, a plurality of cables and corresponding guides are used on the other side of the seat back. The panels 230 and 232 can include raised ridges (not shown) into which the cables are housed. The raised ridges can also function as sliding members extending above the carpeted surface of the panels 230 and 232 for easily moving cargo on the load floor 214.

The automatic unfolding of the panels 230 and 232 will now be described. As shown in FIG. 20, the side frame 220 is rotated towards its horizontal position, indicated by phantom lines 318. As the side frame 220 is rotated, the pin 326 acts on the second leg 324 rotating the bell crank 320 counter-clockwise as shown in FIG. 20. Rotation of the bell crank 320 causes the end 325 of the first leg 322 to engage the panel 230, causing the panel 230 to rotate counter-clockwise about the hinge 231. Movement of the panel 230 causes the cable to be pulled downward, as viewing FIG. 21, because of the increasing distance between the guides 336 and 338. The spring 332 provides tension for the cable 334 so that the cable 334 does not slip from the guides. Preferably, the biasing force of the spring 332 is less than the biasing force of the springs in the hinges 231 and 233. As the cable 334 is pulled the panel 232 is rotated counter-clockwise relative to the panel 230.

Figure 22:
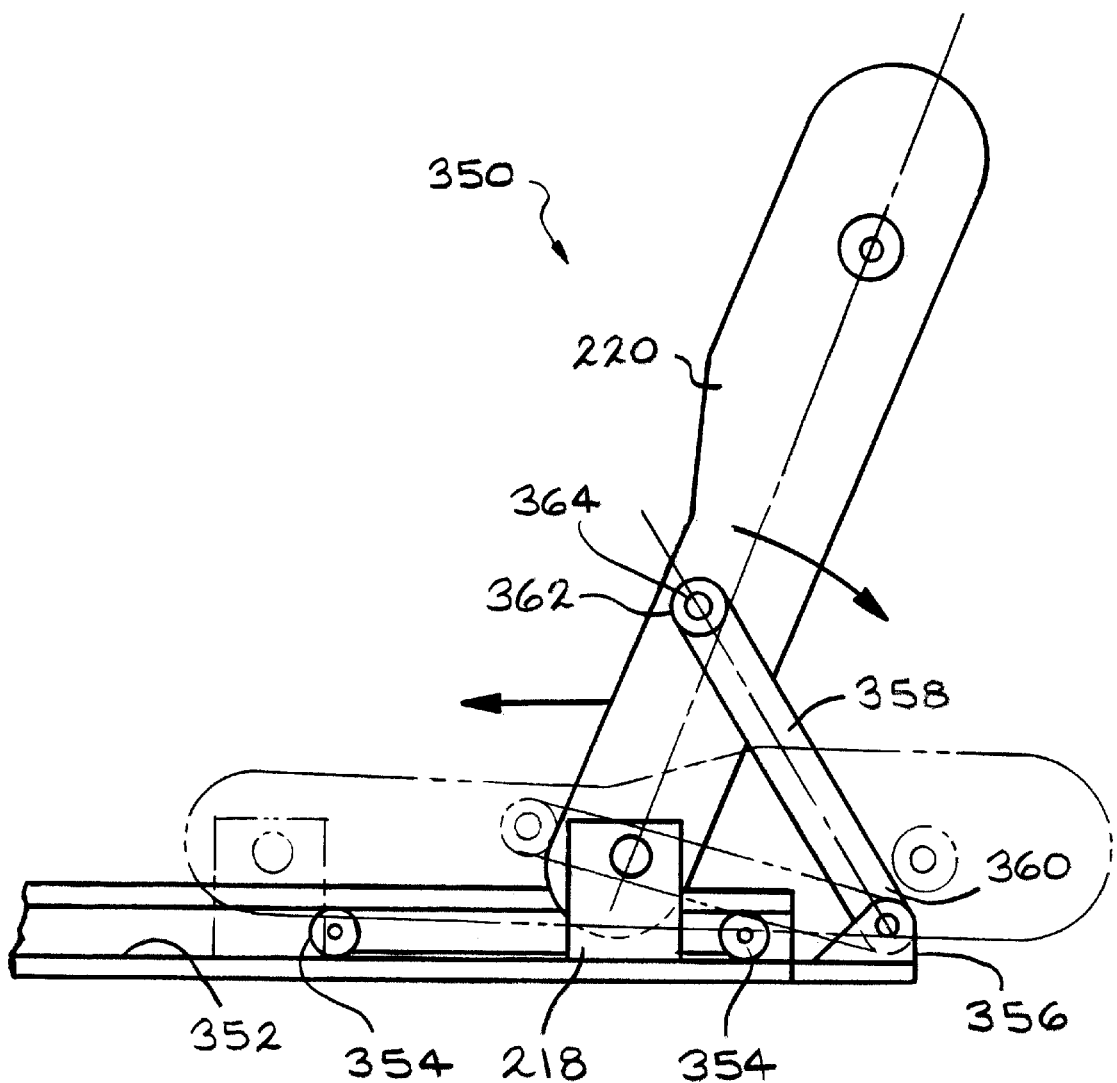
FIG. 22 is a schematic side view of a fourth embodiment of a vehicle seat, in accordance with the present invention.

There is illustrated in FIG. 22 an alternate embodiment of a seat track assembly 350, which can be used for the seat track assembly 216, of FIGS. 14 and 15. Like reference numbers will be used for similar structures. The seat track assembly 350 provides automatic fore and aft movement of the seat 212. The bracket 218 is slidably mounted within a track 352. Although the track assembly 350 is illustrated with rollers 354, any suitable seat track mechanism can be used. A bracket 356 is fixed relative to the vehicle floor. A link 358 has an end 360 pivotally attached to the bracket 356. Another end 362 of the link 358 is attached to the side frame 220 at a pivot 364. As the side frame 220 is rotated clockwise, as viewing FIG. 22, the lower portion of the side frame 220 is move leftward by the link 358 which causes the bracket 218 and the attached seat bottom 212b to move in the forward direction, as viewing FIG. 22.

Preferably, the embodiments shown in FIGS. 14 through 22 are operated by the single motor 250, which can be actuated by a switch or transmitter, such as a key fob transmitter.

As stated before, the seats 12 and 212 of the present invention can be manually or power actuated. For example, instead of the power actuated pivot mechanism 260 and the recliner mechanism 300 as shown in FIG. 14, the seat 212 could include a manually actuated latch mechanism for the pivot mechanism and/or the recliner mechanism. The latch could be disengaged by a manually operated lever. The seats 12 and 212 could also incorporate catches which would lock the mechanisms when at various positions, such as the upright or fully extended or deployed positions. The seat 212 could also include a mechanical latch for releasably engaging the track assemblies 216. The seats 12 and 212 could also include location sensors on their respective panels so that manual or power mechanisms are not actuatable if the panels, or any other seat structure, is not in a correct position which would interfere with the operation of the seta. For example, if the seat 12 included manually operated panels 28 and 30, sensors could be used to detect if the panels 28 and 30 are in their extended positions, as shown in FIG. 8, so that the motors 60, 84, 102, and 112 cannot be actuated until the panels are placed in their normal positions, as shown in FIG. 5.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A vehicle seat comprising:

a seat bottom;

a side member pivotally mounted relative to said seat bottom about a first axis; and a seat back rotatably mounted on said side member such that said seat back is rotatable about a horizontally extending second axis;

wherein said seat back is movable between multiple reclined seating positions by movement of said seat back about said first axis;

and wherein said seat back has a seating surface on one side thereof and a back surface on the other side thereof, said seat back being rotatable about said second axis between a first position, wherein said seating surface faces forward in a vehicle in which said seat is mounted and said back surface faces rearward in the vehicle, and a second position, wherein said seating surface faces rearward in the vehicle and said back surface faces forward in the vehicle.

2. The vehicle seat of claim 1, wherein said seat back rotates about 180 degrees between said first and second positions.

3. The vehicle of claim 2, wherein said seat includes a stop for preventing further rotation of said seat back beyond about 180 degree rotational movement.

4. The vehicle seat of claim 1 further including a second side member extending upward from said seat bottom, said seat back being rotatably mounted on said second side member about said horizontally extending axis such that said seat back is positioned between said side member and said second side member.

5. The vehicle seat of claim 1, wherein said seat back is rotatably mounted on said side member about said horizontally extending axis centrally located between upper and lower ends of said seat back.

6. The vehicle seat of claim 1 further including a power actuated mechanism which can be actuated to rotate said seat back.

7. The vehicle seat of claim 1, wherein said seat back is rotatably mounted on said side member by a Geneva wheel and crank mechanism.

8. The vehicle seat of claim 1, wherein said side member is mounted on a frame of said seat bottom.

9. The vehicle seat of claim 1 wherein said side member is rotatably mounted on said seat bottom.

10. The vehicle seat of claim 1 further including a power actuated mechanism which can be actuated to rotate said side member.

11. The vehicle seat of claim 1 wherein said side member is rotatably mounted on said seat bottom by a Geneva wheel and crank mechanism.

12. The vehicle seat of claim 1 further including a mechanism connected to said seat bottom for moving said seat bottom in a fore and aft direction relative to a floor of the vehicle.

13. The vehicle seat of claim 12, wherein said mechanism includes a sliding track assembly.

14. The vehicle seat of claim 12 wherein said mechanism includes a link having a first end pivotally attached to said seat bottom, and a second end pivotally attached relative to the floor of the vehicle.

15. The vehicle seat of claim 14, wherein said mechanism moves said seat bottom between a rearward position and a forward position within the vehicle, wherein a front portion of said seat bottom is at a lower position in said forward position than when in said rearward position.

16. The vehicle seat of claim 12, wherein said mechanism is power actuated.

17. The vehicle seat of claim 1 further including an extension panel fastened to said seat back such that said extension panel is movable between a first position adjacent said seat back, and an extended position extending outward from said seat back.

18. The vehicle seat of claim 17, wherein said extension panel is pivotally attached to said seat back.

19. The vehicle seat of claim 18, wherein said extension panel is pivotally attached to an upper portion of said seat back when said seat back is in a position defining a seating position.

20. The vehicle seat of claim 17, wherein said extension panel is slidably mounted on said seat back.

21. The vehicle seat of claim 17, wherein said extension panel is movable between said first and extended positions by a power actuated assembly.

22. The vehicle seat of claim 17, wherein said seat back has a relatively flat rear surface.

23. The vehicle seat of claim 17, further including a second panel pivotally connected to said extension panel.

24. A method of moving a vehicle seat from a seating position to a storage position to form a load floor comprising the steps of:
  a. providing a vehicle seat including:
    a seat bottom;
    a side member having first and second ends, the first end pivotally attached relative to the seat bottom such that the side member is rotatable about a first axis; and
    a seat back rotatably mounted to the second end of the side member such that the seat back rotates about a second axis, the seat back having a seating surface on one side thereof, and a back surface on the other side, the seat back being in a normal seating position wherein the seating surface faces forward in the vehicle and the back surface faces rearward in the vehicle;
  b. rotating the seat back about the second axis such that the seating surface faces rearward in the vehicle and the back surface faces forward in the vehicle; and
  c. subsequently to step (b), pivoting the side member about the first axis to move the seat back to a generally horizontal position such that the back surface faces upward, thereby forming a load floor defined by the back surface of the seat back.

25. The method of claim 24, wherein the vehicle seat includes a panel, the method further comprising the step of moving the panel from a first position adjacent the back surface of the seat back to a second movable wherein the panel extends outwardly from the seat back and positioned above the seat bottom, wherein the back surface of the seat back and the panel define the load floor.

26. The method of claim 24, wherein the panel is moved to the second position such the panel is generally co-planar with the back surface of the seat back.

27. The method of claim 24, wherein step (c) is performed subsequently to step (b).

28. The method of claim 24, wherein step (b) is performed simultaneously with step (c).

29. The method of claim 24 further providing a second seat having a seat bottom and a seat back pivotable relative to the seat bottom, the method further comprising the step of moving the seat back to a generally horizontal position such that a back surface of the seat back faces upward, wherein the back surface further defines the load floor.

30. The seat back of claim 1, wherein said first end of said side member is directly pivotally mounted on a frame member of said seat bottom.

31. The seat back of claim 1, wherein said seat bottom includes a cushion for supporting an occupant, and wherein said cushion is fixed relative to said first axis.

32. A vehicle seat comprising:
  a seat bottom;
  a side member pivotally mounted relative to said seat bottom about a first axis; and
  a seat back rotatably mounted on said side member such that said seat back is rotatable about a horizontally extending second axis,
  wherein said seat back has a seating surface on one side thereof and a back surface on the other side thereof, said seat back being rotatable about said second axis between a first position, wherein said seating surface faces forward in a vehicle in which said seat is mounted and said back surface faces rearward in the vehicle, and a second position, wherein said seating surface faces rearward in the vehicle and said back surface faces forward in the vehicle;
  wherein said seat back is movable between said first and second positions without rotational movement of said side member about said first axis.

33. The vehicle seat of claim 32, wherein said seat back rotates about 180 degrees between said first and second positions.

* * * * *